(12) United States Patent
Ohashi

(10) Patent No.: US 11,560,197 B2
(45) Date of Patent: Jan. 24, 2023

(54) ELECTRIC ASSIST BICYCLE

(71) Applicant: YAMAHA HATSUDOKI KABUSHIKI KAISHA, Iwata (JP)

(72) Inventor: Toru Ohashi, Shizuoka (JP)

(73) Assignee: YAMAHA HATSUDOKI KABUSHIKI KAISHA, Shizuoka (JP)

(*) Notice: Subject to any disclaimer, the term of this patent is extended or adjusted under 35 U.S.C. 154(b) by 505 days.

(21) Appl. No.: 16/790,768

(22) Filed: Feb. 14, 2020

(65) Prior Publication Data

US 2020/0180728 A1 Jun. 11, 2020

Related U.S. Application Data

(63) Continuation of application No. PCT/JP2017/029469, filed on Aug. 16, 2017.

(51) Int. Cl.
*B62M 6/40* (2010.01)
*B62J 50/22* (2020.01)
(Continued)

(52) U.S. Cl.
CPC ............... *B62M 6/40* (2013.01); *B62J 43/13* (2020.02); *B62J 45/41* (2020.02); *B62J 50/22* (2020.02); *B62M 6/45* (2013.01)

(58) Field of Classification Search
CPC ... B62M 6/45; B62M 6/40; B62M 6/50; B62J 50/22; B62J 45/20; B62J 45/41; B62J 43/13; B62K 23/02
See application file for complete search history.

(56) References Cited

U.S. PATENT DOCUMENTS 6,134,508 A * 10/2000 Brandt ............... B62J 50/22
340/432
9,157,523 B2 * 10/2015 Miki ............... B62M 25/08
(Continued)

FOREIGN PATENT DOCUMENTS

CN 1607159 A 4/2005
CN 105270556 A 1/2016
(Continued)

OTHER PUBLICATIONS

Official Communication issued in corresponding Chinese Patent Application No. 201780093987.8, dated Nov. 30, 2020.
(Continued)

*Primary Examiner* — Anne Marie M Boehler
(74) *Attorney, Agent, or Firm* — Keating and Bennett, LLP

(57) ABSTRACT

An electric assist bicycle includes an electric motor that generates an assistance force to assist a human force of a rider, a handle to be gripped by the rider with a hand to steer the electric assist bicycle, a manipulation device provided on the handle and including an operation switch that receives a manipulation from the rider and an alternate switch that receives a manipulation from the rider to change functions to be assigned to the operation switch, and a control circuit that performs a control to alter an operation to be executed by the electric assist bicycle depending on whether the rider manipulates the operation switch in a state of keeping the alternate switch manipulated or the rider manipulates the operation switch in a state of not manipulating the alternate switch.

19 Claims, 24 Drawing Sheets

(51) Int. Cl.
  *B62M 6/45* (2010.01)
  *B62J 43/13* (2020.01)
  *B62J 45/41* (2020.01)

(56) References Cited

U.S. PATENT DOCUMENTS

| | | | |
|---|---|---|---|
| 10,137,964 B2* | 11/2018 | Kurokawa | B62M 25/08 |
| 2004/0017286 A1 | 1/2004 | Takeda | |
| 2005/0103144 A1 | 5/2005 | Tatewaki et al. | |
| 2013/0090195 A1 | 4/2013 | Yamaguchi et al. | |
| 2015/0367750 A1 | 12/2015 | Takamoto et al. | |
| 2016/0016638 A1 | 1/2016 | Miyoshi et al. | |
| 2016/0195950 A1 | 7/2016 | Yang et al. | |
| 2016/0297499 A1 | 10/2016 | Ohashi et al. | |
| 2017/0029057 A1 | 2/2017 | Kato et al. | |
| 2017/0151999 A1 | 6/2017 | Kinpara | |
| 2017/0355412 A1* | 12/2017 | Takeshita | B60L 15/30 |
| 2018/0029666 A1* | 2/2018 | Shahana | B62M 6/50 |
| 2018/0072374 A1* | 3/2018 | Kishita | B62M 6/40 |
| 2018/0148127 A1* | 5/2018 | Sato | B62L 3/02 |
| 2018/0170277 A1* | 6/2018 | Yamamoto | B62K 11/00 |
| 2018/0178870 A1* | 6/2018 | Takeshita | B62J 50/22 |
| 2018/0257741 A1* | 9/2018 | Saruwatari | B62M 3/08 |
| 2019/0009852 A1* | 1/2019 | Shirai | B62J 1/08 |
| 2019/0315423 A1* | 10/2019 | Usui | B62K 25/08 |
| 2021/0031870 A1* | 2/2021 | Tetsuka | B62K 23/02 |

FOREIGN PATENT DOCUMENTS

| | | |
|---|---|---|
| CN | 105270557 A | 1/2016 |
| CN | 106394801 A | 2/2017 |
| DE | 10 2015 110 317 A1 | 1/2016 |
| JP | 09-226664 A | 9/1997 |
| JP | 2004-058993 A | 2/2004 |
| JP | 5279382 B2 | 9/2013 |
| JP | 5566760 B2 | 8/2014 |
| JP | 2016-022954 A | 2/2016 |
| JP | 2016-199084 A | 12/2016 |
| JP | 2017-030701 A | 2/2017 |
| TW | 201315638 A | 4/2013 |

OTHER PUBLICATIONS

Official Communication issued in International Patent Application No. PCT/JP2017/029469, dated Oct. 3, 2017.

Official Communication issued in corresponding Chinese Patent Application No. 201780093987.8, dated Jul. 21, 2021.

* cited by examiner

ELECTRIC ASSIST BICYCLE

BACKGROUND OF THE INVENTION

1. Field of the Invention

The present invention relates to an electric assist bicycle including a manipulation device.

2. Description of the Related Art

Electric assist bicycles having an electric motor that assists in the force applied by a rider stepping on the pedals are known (see, for example, "Japanese Laid-Open Patent Publication No. 09-226664"). In an electric assist bicycle, the electric motor generates a driving power which is in accordance with the human force that a rider applies to the pedals, such that the burden of the rider when going up an ascent, or carrying luggage, can be reduced.

Near the grips on the handle of an electric assist bicycle, a manipulation device is provided on which a plurality of switches are disposed to receive instructions from the rider. By manipulating the switches on the manipulation device, the rider is able to toggle between powering ON and OFF of the electric assist bicycle, or set the magnitude of an assistance force to be generated by the electric motor.

In recent years, in various countries of the world, electric assist bicycles are considered as a means of transportation for casual use, and are becoming increasingly popular. As such, an electric assist bicycle is required to have many functions. For example, on the European market, it is desired for electric assist bicycles to have a wide variety of functions, e.g., a self-propelling function such as a walk-along function, or a data communication function with a smartphone or a cloud on an IOT (Internet of Things) basis, and so on.

With such expansion in the functions of electric assist bicycles, a manipulation device to be provided on the handle needs to be able to receive many kinds of instructions from the rider. On the other hand, components of an electric assist bicycle are expected to have designs approximating conventional bicycle styles; thus, downsizing of each component, and designs conforming to the vehicle body, are required.

A manipulation device is likely to be an add-on to the handle bar, which has brake levers, a shifter, and other parts provided thereon. Under such conditions of attachment, it is difficult to increase the number of switches on the manipulation device, or increase its size. In favor of the housing design, the size of each individual switch may be reduced to allow a number of switches to huddle together; however, doing so is inconvenient because it will hinder manipulations.

SUMMARY OF THE INVENTION

Preferred embodiments of the present invention provide electric assist bicycles which make it possible to receive many kinds of instructions from a rider while reducing a number of switches on a manipulation device to be provided on a handle.

An electric assist bicycle according to a preferred embodiment of the present invention is an electric assist bicycle including an electric motor that generates an assistance force to assist a human force of a rider, and includes a handle to be gripped by the rider with a hand to steer the electric assist bicycle; a manipulation device provided on the handle, the manipulation device including an operation switch to receive a manipulation from the rider and an alternate switch to receive from the rider a manipulation to change a function to be assigned to the operation switch; and a control circuit to perform a control to alter an operation to be executed by the electric assist bicycle depending on whether the rider manipulates the operation switch in a state of keeping the alternate switch manipulated, or the rider manipulates the operation switch in a state of not manipulating the alternate switch.

According to a preferred embodiment of the present invention, depending on whether the rider manipulates the operation switch in a state of keeping the alternate switch manipulated or the rider manipulates the operation switch in a state of not manipulating the alternate switch, the operation to be executed by the electric assist bicycle is altered. This provides a plurality of functions to the operation switch provided on the handle of the electric assist bicycle. It is possible to receive many kinds of instructions from the rider while reducing the number of switches. This allows the manipulation device to be downsized, and provides an improved design freedom.

In a preferred embodiment of the present invention, the alternate switch is able to receive a plurality of kinds of manipulations from the rider; and, in accordance with the kind of manipulation received by the alternate switch, the control circuit performs a control to change the operation to be executed by the electric assist bicycle when the rider manipulates the operation switch.

This assigns more functions to the operation switch provided on the handle of the electric assist bicycle. While reducing the number of switches to be provided on the handle of the electric assist bicycle, it is possible to receive many kinds of instructions from the rider.

In a preferred embodiment of the present invention, the alternate switch is manipulated by the rider with a finger; and the control circuit performs a control to: when the alternate switch is manipulated alone, cause the electric assist bicycle to execute a first operation that is different from an operation of changing the function to be assigned to the operation switch; when the operation switch is manipulated alone, cause the electric assist bicycle to execute a second operation that is different from the first operation; and, when the operation switch is manipulated in a state in which the alternate switch keeps being manipulated, cause the electric assist bicycle to execute a third operation that is different from the first and second operations.

By allowing the alternate switch to provide a function that is distinct from changing the function to be assigned to the operation switch, while reducing the number of switches to be provided on the handle of the electric assist bicycle, it is possible to receive more kinds of instructions from the rider. For example, a switch by which the walk-along mode is to be entered may provide the functions of both an operation switch and an alternate switch. Thus, while reducing the number of switches, it is possible to receive more kinds of instructions from the rider.

In a preferred embodiment of the present invention, the manipulation device includes a plurality of the operation switches; and the control circuit performs a control to, in accordance with the rider's manipulation received by the alternate switch, change the operation to be executed by the electric assist bicycle when the rider manipulates each of the operation switches.

This assigns a plurality of functions to each of a plurality of operation switches that are provided on the handle of the electric assist bicycle. While reducing the number of switches to be provided on the handle of the electric assist bicycle, it is possible to receive more kinds of instructions from the rider.

In a preferred embodiment of the present invention, the alternate switch is a push button switch; the state in which the rider keeps the alternate switch manipulated is a state in which the rider keeps the alternate switch pressed; and the control circuit performs a control to alter an operation to be executed by the electric assist bicycle depending on whether the rider manipulates the operation switch in a state of keeping the alternate switch pressed, or the rider manipulates the operation switch in a state of not pressing the alternate switch.

Through a manipulation of keeping the alternate switch pressed, which is easy for the rider, a plurality of functions are able to be assigned to the operation switch.

In a preferred embodiment of the present invention, the operation switch is a push button switch; and the control circuit performs a control to alter an operation to be executed by the electric assist bicycle depending on whether the rider presses the operation switch in a state of keeping the alternate switch pressed, or the rider presses the operation switch in a state of not pressing the alternate switch.

Through a manipulation of pressing the operation switch while keeping the alternate switch pressed, which is easy for the rider, a plurality of functions are assigned to the operation switch.

In a preferred embodiment of the present invention, the operation switch and the alternate switch are disposed so as to be manipulated by the rider with fingers; and one of the operation switch and the alternate switch is located forward of the other.

This facilitates simultaneous manipulations of the operation switch and the alternate switch, with two fingers of the rider. For example, while manipulating one of the switches with an index finger or a middle finger, the other switch is able to be easily manipulated with a thumb. Since the structure facilitates manipulation of the operation switch in a state of keeping the alternate switch manipulated, the rider is able to quickly perform the manipulation of changing the function to be assigned to the operation switch.

In a preferred embodiment of the present invention, the operation switch and the alternate switch are disposed in a mutually overlapping positional relationship along a front-rear direction of the electric assist bicycle.

This makes it easy to, while manipulating one of the operation switch and the alternate switch with an index finger or a middle finger, manipulate the other with a thumb. Since the structure facilitates manipulation of the operation switch in a state of keeping the alternate switch manipulated, the rider is able to quickly perform the manipulation of changing the function to be assigned to the operation switch.

In a preferred embodiment of the present invention, the alternate switch is disposed so as to be manipulated by the rider with a finger; and at least a portion of the alternate switch is located forward of an axial center of the handle at a position on the handle where the manipulation device is disposed.

In the bicycle body structure, in implementations in which manipulation of the operation switch is performed with a thumb of the rider, manipulating the alternate switch with a finger other than the thumb facilitates simultaneous manipulations of the operation switch and the alternate switch. By disposing the alternate switch forward of the axial center of the handle, manipulation of the alternate switch with a finger other than the thumb, e.g., an index finger or a middle finger, is facilitated. Since the structure facilitates manipulation of the operation switch in a state of keeping the alternate switch manipulated, the rider is able to quickly perform the manipulation of changing the function to be assigned to the operation switch.

In a preferred embodiment of the present invention, the operation switch is disposed so as to be manipulated by the rider with a finger; and at least a portion of the operation switch is located rearward of the axial center of the handle.

This allows the operation switch to be located in a position where it is easily manipulated with a thumb of the rider. By disposing the alternate switch forward of the axial center of the handle, and locating the operation switch rearward of the axial center of the handle, simultaneous manipulations of the operation switch and the alternate switch is facilitated.

In a preferred embodiment of the present invention, the operation switch is disposed so as to be manipulated by the rider with a finger; and at least a portion of the operation switch is disposed above the alternate switch.

This allows the operation switch to be located in a position where it is easily manipulated with a thumb of the rider. By disposing the alternate switch forward of the axial center of the handle, and disposing the operation switch above the alternate switch, simultaneous manipulations of the alternate switch and the operation switch with an index finger and a thumb is facilitated.

In a preferred embodiment of the present invention, the operation switch defines an assistance force setting switch with which to set the assistance force from the electric motor; and while the rider keeps the alternate switch manipulated, the control circuit assigns to the assistance force setting switch a function that is different from setting the assistance force from the electric motor.

Since the assistance force setting switch provides a plurality of functions, while reducing the number of switches to be provided on the handle of the electric assist bicycle, it is possible to receive more kinds of instructions from the rider.

A preferred embodiment of the present invention further includes a display device to display information concerning the electric assist bicycle, wherein the control circuit performs a control to change a display mode of the display device when the rider manipulates the assistance force setting switch while keeping the alternate switch manipulated.

Since the assistance force setting switch provides a plurality of functions, while reducing the number of switches to be provided on the handle of the electric assist bicycle, it is possible to receive more kinds of instructions from the rider.

In a preferred embodiment of the present invention, when the rider keeps the assistance force setting switch manipulated while keeping the alternate switch manipulated, the control circuit performs a control to cause the electric assist bicycle to enter a walk-along mode to allow the electric motor to generate an assistance force while the rider walks along with the electric assist bicycle.

As a result, without providing a switch for the walk-along mode in the manipulation device, an instruction to enter the walk-along mode is able to be received from the rider. Since the assistance force setting switch provides a plurality of functions, while reducing the number of switches to be provided on the handle of the electric assist bicycle, it is possible to receive more kinds of instructions from the rider.

In a preferred embodiment of the present invention, the operation switch defines a walk-along switch to receive from the rider an instruction to enter a walk-along mode to allow the electric motor to generate an assistance force while the rider walks along with the electric assist bicycle.

Since the walk-along switch by which the walk-along mode is to be entered provides a plurality of functions, while reducing the number of switches to be provided on the handle of the electric assist bicycle, it is possible to receive more kinds of instructions from the rider.

In a preferred embodiment of the present invention, the control circuit performs a control to cause the electric assist bicycle to enter the walk-along mode when the rider keeps the walk-along switch manipulated while keeping the alternate switch manipulated.

The walk-along mode is entered when the walk-along switch keeps being manipulated while the alternate switch keeps being manipulated. This prevents the walk-along mode from being entered because of unintended touching of the walk-along switch with a finger or luggage, etc.

In a preferred embodiment of the present invention, when the walk-along switch is manipulated alone, the control circuit performs a control to cause the electric assist bicycle to execute an operation that is different from the walk-along mode.

Depending on whether the alternate switch is manipulated or not, the function to be assigned to the walk-along switch is changed. As a result, while reducing the number of switches to be provided on the handle of the electric assist bicycle, it is possible to receive more kinds of instructions from the rider.

In a preferred embodiment of the present invention, the alternate switch defines a walk-along switch to receive from the rider an instruction to enter a walk-along mode to allow the electric motor to generate an assistance force while the rider walks along with the electric assist bicycle.

The walk-along switch by which the walk-along mode is to be entered receives from the rider an instruction to change the function to be assigned to the operation switch. Since the switch that provides a specific function also provides the function of receiving from the rider an instruction to change the function to be assigned to the operation switch, while reducing the number of switches to be provided on the handle of the electric assist bicycle, it is possible to receive more kinds of instructions from the rider.

A preferred embodiment of the present invention further includes an alarm device to inform the rider of a status concerning the received manipulation from the rider regarding the alternate switch.

Informing the rider of a status concerning the received manipulation from the rider allows the rider to know how the electric assist bicycle will operate when the operation switch is manipulated.

A preferred embodiment of the present invention further includes a display device to display information that represents a status concerning the received manipulation from the rider regarding the alternate switch.

By seeing the information that is displayed on the display device, the rider can see how the electric assist bicycle will operate when the operation switch is manipulated.

Depending on whether a rider manipulates an operation switch in a state of keeping an alternate switch manipulated or the rider manipulates the operation switch in a state of not manipulating the alternate switch, an operation to be executed by an electric assist bicycle is altered. This assigns a plurality of functions to the operation switch provided on a handle of the electric assist bicycle. As the operation switch provides a plurality of functions, it is possible to receive many kinds of instructions from the rider while reducing the number of switches. While allowing the manipulation device to be downsized, design freedom is improved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
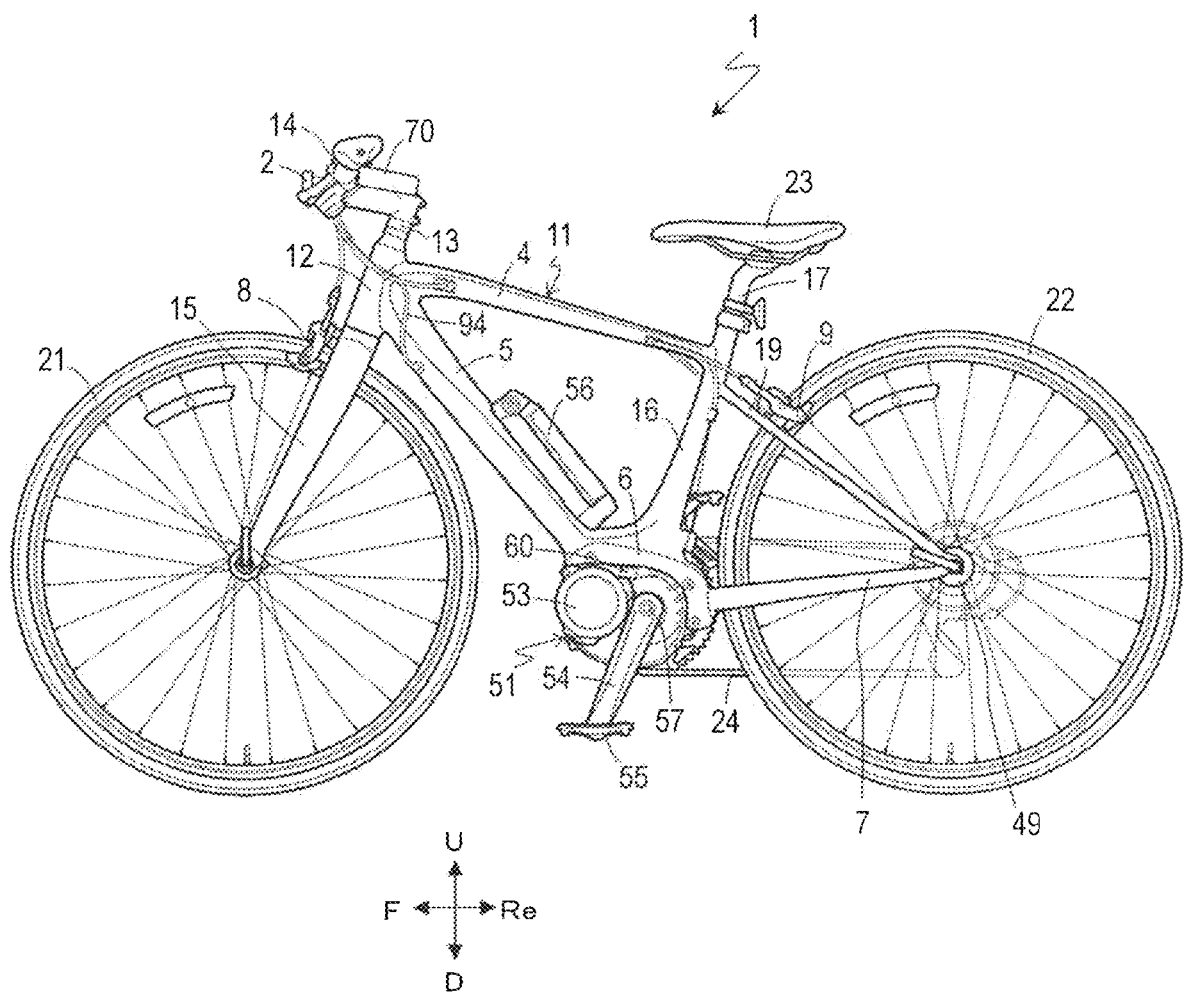
FIG. 1 is a side view showing an electric assist bicycle according to a preferred embodiment of the present invention.

Hereinafter, with reference to the drawings, electric assist bicycles according to preferred embodiments of the present invention will be described. In the description of the preferred embodiment(s), like component elements are denoted by like reference numerals, and description of any overlapping component elements will be omitted. In the preferred embodiments of the present invention, any reference to "front/rear", "right/left" and "above (up)/below (down)" is based on a state in which a rider is seated on a saddle (seat) of an electric assist bicycle so as to face the handle. In the drawings, reference numerals F, Re, L, R, U and D respectively represent front, rear, left, right, up, and down. Note that the following preferred embodiments are illustrative, and the present invention is not limited to the following preferred embodiment(s).

FIG. 1 is a side view showing an electric assist bicycle 1 according to a preferred embodiment of the present invention.

The electric assist bicycle 1 includes a body frame 11. The body frame 11 includes a head pipe 12, a top tube 4, a down tube 5, a bracket 6, a chain stay 7, a seat tube 16, and a seat stay 19. The head pipe 12 is disposed at the front end of the body frame 11. The handle stem 13 is inserted in the head pipe 12 so as to be capable of rotation. A handle 14 is fixed at an upper portion of the handle stem 13. Front forks 15 are fixed at a lower portion of the handle stem 13. Lower end portions of the front forks 15 support a front wheel 21, serving as a steering wheel, so as to be capable of rotation. A brake 8 to act on the front wheel 21 is provided on the front forks 15. On the handle 14, a display device 70 is provided for displaying various information concerning the electric assist bicycle 1. A headlamp 2 is provided forward of the handle stem 13.

The down tube 5 extends obliquely below and rearward from the head pipe 12. The seat tube 16 extends upward from a rear end portion of the down tube 5. The chain stay 7 extends rearward from a lower end portion of the seat tube 16. The bracket 6 connects together the rear end portion of the down tube 5, the lower end portion of the seat tube 16, and a front end portion of the chain stay 7. The top tube 4 connects the head pipe 12 with an upper portion of the seat tube 16.

A seat post 17 is inserted in the seat tube 16, and a saddle 23 for a rider to sit on is provided at an upper end portion of the seat post 17. A rear end portion of the chain stay 7 supports a rear wheel 22, which serves as a drive wheel, so as to be capable of rotation. The seat stay 19 extends obliquely below and rearward from an upper portion of the seat tube 16. A lower end portion of the seat stay 19 is connected to the rear portion of the chain stay 7. A brake 9 to act on the rear wheel 22 is provided on the seat stay 19. A speed sensor 49 to detect rotation of the rear wheel 22 is provided at the rear end portion of the chain stay 7.

A drive unit 51 is provided on the bracket 6, which in itself is located near the vehicle central portion of the body frame 11. The drive unit 51 includes an electric motor 53, a crank shaft 57, and a controller 60. A battery 56 to supply electric power to the electric motor 53 and the like is mounted on the down tube 5. The battery 56 may be mounted to the bracket 6 or the seat tube 16. The battery 56 is detachable from the electric assist bicycle 1. Charging of the battery 56 is performed by connecting the battery 56 to an external charger (not shown), with the battery 56 being removed from the electric assist bicycle 1, for example.

The crank shaft 57 is supported by the drive unit 51 in a manner of extending therethrough in the right-left direction. Crank arms 54 are provided at both ends of the crank shaft 57. At the leading end of each crank arm 54, a pedal 55 is provided so as to be capable of rotation.

The controller 60 controls the operation of the electric assist bicycle 1. Typically, the controller 60 includes a semiconductor integrated circuit such as a microcontroller, a signal processor, etc., that is capable of digital signal processing. A rotational output of the crank shaft 57 which is generated as the rider steps on the pedals 55 with his or her feet is transmitted to the rear wheel 22 via a chain 24. The controller 60 controls the electric motor 53 so as to generate a drive assisting output in accordance with the rotational output of the crank shaft 57. The assistance force which is generated by the electric motor 53 is transmitted to the rear wheel 22 via the chain 24. Instead of the chain 24, a belt, a shaft, or the like may be used. With the electric assist bicycle 1, the burden of the rider is able to be reduced because the electric motor 53 generates an assistance force to assist with the human force of the rider.

Figure 2:
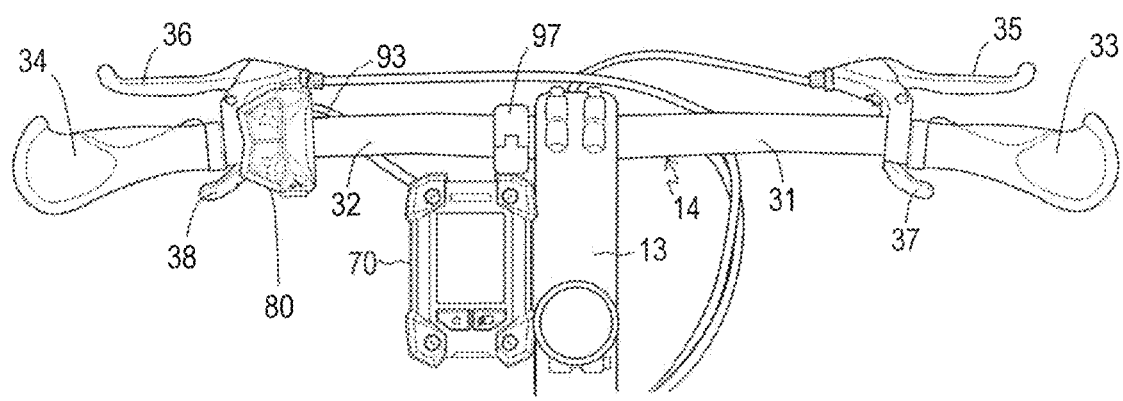
FIG. 2 is an upper plan view showing a front portion of an electric assist bicycle according to a preferred embodiment of the present invention.
Figure 2:
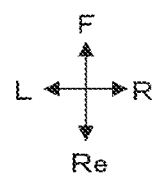

FIG. 2 is an upper plan view showing a front portion of the electric assist bicycle 1. The handle 14 includes a right handle bar 31 and a left handle bar 32. A right grip 33 is provided at the right end of the right handle bar 31. A left grip 34 is provided at the left end of the left handle bar 32. The rider steers while gripping the right grip 33a and the left grip 34 with the hands.

A front-wheel brake lever 35 and a gear shifter 37 are provided near the right grip 33. A rear-wheel brake lever 36 and a gear shifter 38 are provided near the left grip 34. As the front-wheel brake lever 35 is gripped by the right hand together with the right grip 33, braking power is applied to the front wheel 21. As the rear-wheel brake lever 36 is gripped by the left hand together with the left grip 34, braking power is applied to the rear wheel 22. The gear shifters 37 and 38 are also called shifters. By manipulating the gear shifters 37 and 38, the rider is able to switch the gear ratio.

On the handle 14, the display device 70 is provided for displaying various information concerning the electric assist bicycle 1. In this example, the display device 70 is attached to the left handle bar 32 by using a clamp 97. A manipulation device 80 is provided near the left grip 34 on the left handle bar 32. By manipulating the manipulation device 80 with a finger, the rider is able to perform various manipulations, such as setting the magnitude of an assistance force of the electric motor 53. A signal in accordance with the rider's manipulation is sent from the manipulation device 80 to the display device 70, via wiring lines 93. The display device 70 and the controller 60 of the drive unit 51 (FIG. 1) are able to exchange signals via the wiring lines 94 (FIG. 1).

Figure 3:
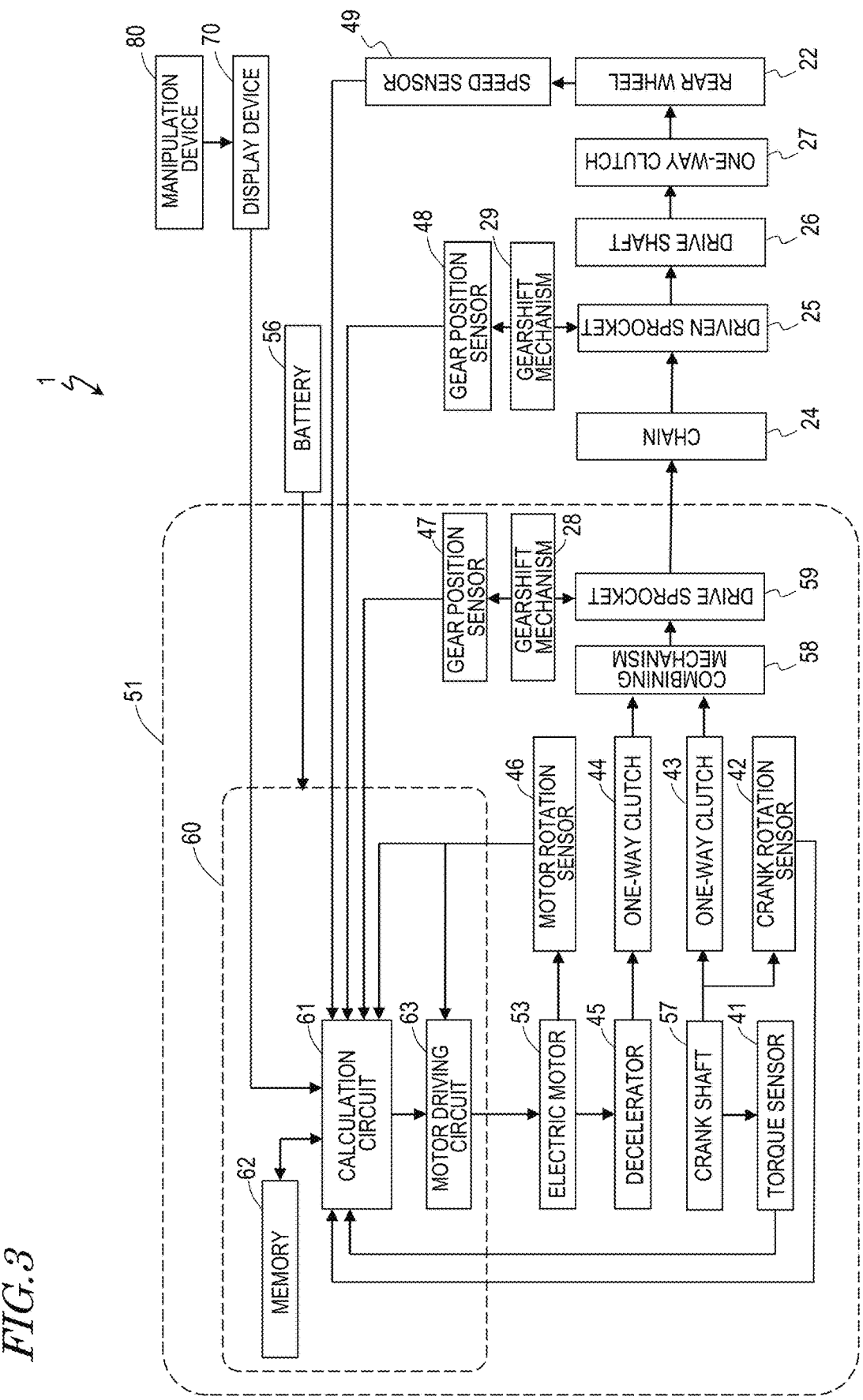
FIG. 3 is a block diagram showing a mechanical and electrical construction of an electric assist bicycle according to a preferred embodiment of the present invention.

FIG. 3 is a block diagram showing a mechanical and electrical construction of the electric assist bicycle 1. The drive unit 51 includes the controller 60, the electric motor 53, a motor rotation sensor 46, a decelerator 45, a one-way clutch 44, the crank shaft 57, a one-way clutch 43, a torque sensor 41, a crank rotation sensor 42, a combining mechanism 58, a drive sprocket 59, and a gearshift mechanism 28, and a gear position sensor 47. The drive unit 51 is an assisting output controlling system that causes the electric motor 53 to generate a drive assisting output in accordance with the human force of a rider applied to the pedals 55 (FIG. 1).

First, the transmission path of motive power will be described. As the rider steps on the pedals 55 (FIG. 1) to rotate the crank shaft 57, this rotation of the crank shaft 57 is transmitted to the combining mechanism 58 via the one-way clutch 43. Via the decelerator 45 and the one-way clutch 44, rotation of the electric motor 53 is transmitted to the combining mechanism 58.

The combining mechanism 58 may include, e.g., a cylindrical member, such that the crank shaft 57 is disposed inside the cylindrical member. The combining mechanism 58 has a drive sprocket 59 mounted thereto. The combining mechanism 58 rotates around the same axis of rotation as the crank shaft 57 and the drive sprocket 59.

The one-way clutch 43 transmits any forward rotation of the crank shaft 57 to the combining mechanism 58, while not transmitting any backward rotation of the crank shaft 57 to the combining mechanism 58. The one-way clutch 44 transmits to the combining mechanism 58 any rotation that is generated by the electric motor 53 in a direction to cause forward rotation of the combining mechanism 58, while not transmitting to the combining mechanism 58 any rotation occurring in a direction to cause backward rotation of the combining mechanism 58. Moreover, while the electric motor 53 is stopped, if the rider moves the pedals 55 so that the combining mechanism 58 rotates, the one-way clutch 44 does not transmit this rotation to the electric motor 53. The pedaling force which the rider has applied to the pedals 55 and the assistance force which has been generated by the electric motor 53 are transmitted to the combining mechanism 58, where they are merged. The resultant force as obtained by the combining mechanism 58 is transmitted to the chain 24 via the drive sprocket 59.

Rotation of the chain 24 is transmitted to a drive shaft 26 via a driven sprocket 25. Rotation of the drive shaft 26 is transmitted to the rear wheel 22 via the one-way clutch 27.

In this example, the drive sprocket 59 includes a multitude of sprocket wheels. The gearshift mechanism 28 alters the gear ratio in response to the rider's manipulation of the gear shifter 38 (FIG. 2). On the other hand, a gearshift mechanism 29 alters the gear ratio in response to the rider's manipulation of the gear shifter 37 (FIG. 2). For example, the gearshift mechanism 29 may be an external gearshift device, in which case the driven sprocket 25 includes a multitude of sprocket wheels. Note that the gearshift mechanism 29 of the electric assist bicycle 1 may be an internal gearshift device, without being limited to an external gearshift device. Only when the rotational speed of the drive shaft 26 is faster than the rotational speed of the rear wheel 22, the one-way clutch 27 transmits rotation of the drive shaft 26 to the rear wheel 22. When the rotational speed of the drive shaft 26 is slower than the rotational speed of the rear wheel 22, the one-way clutch 27 does not transmit rotation of the drive shaft 26 to the rear wheel 22.

Via the transmission path of motive power, the pedaling force which has been applied by the rider to the pedals 55 and the assistance force which has been generated by the electric motor 53 are transmitted to the rear wheel 22.

Note that the mechanism by which the pedaling force of the rider and the assistance force generated by the electric motor 53 are merged is not limited to the combining mechanism 58, which rotates around the same axis of rotation as the crank shaft 57. The pedaling force and the assistance force may be merged at the chain 24.

Next, the manner in which driving of the electric motor 53 is controlled by the controller 60 will be described. The controller 60 may be, e.g., an MCU (Motor Control Unit). The controller 60 includes a calculation circuit 61, a memory 62, and a motor driving circuit 63. The calculation circuit 61 controls the operation of the electric motor 53, and also controls the operation of each section of the electric assist bicycle 1. The memory 62 stores a computer program that defines a procedure of controlling the operations of the electric motor 53 and the respective sections of the electric assist bicycle 1. The calculation circuit 61 reads the computer program from the memory 62 to perform various controls.

A human force (pedaling force) that the rider has applied to the pedals 55 is detected by the torque sensor 41 as a torque occurring in the crank shaft 57. The torque sensor 41 outputs a voltage signal in accordance with the detected torque to the calculation circuit 61. The calculation circuit 61 converts the voltage signal from the torque sensor 41 into a torque. For example, an analog voltage signal which is input from the torque sensor 41 is converted into a digital value, and a torque is calculated from the magnitude of the digital value.

The crank rotation sensor 42 detects an angle of rotation of the crank shaft 57. To the calculation circuit 61, the crank rotation sensor 42 outputs a signal in accordance with the angle of rotation of the crank shaft 57. For example, the crank rotation sensor 42 may detect rotation of the crank shaft 57 at each predetermined angle, and outputs a rectangular wave signal or a sine wave signal. From the output signal of the crank rotation sensor 42, the calculation circuit 61 calculates a rotational speed of the crank shaft 57. The calculation circuit 61 multiplies the torque and rotational speed of the crank shaft 57, thus calculating a crank rotational output.

The electric motor 53 has the motor rotation sensor 46 mounted thereon. The motor rotation sensor 46 may be an encoder, for example. The motor rotation sensor 46 detects an angle of rotation of the rotor of the electric motor 53, and outputs a signal in accordance with the angle of rotation to the calculation circuit 61 and the motor driving circuit 63. For example, the motor rotation sensor 46 may detect rotation of the rotor at each predetermined angle, and outputs a rectangular wave signal or a sine wave signal. From the output signal of the motor rotation sensor 46, the calculation circuit 61 and the motor driving circuit 63 calculate a rotational speed of the electric motor 53.

The speed sensor 49 detects an angle of rotation of the rear wheel 22, and outputs a signal in accordance with the angle of rotation to the calculation circuit 61. For example, the speed sensor 49 may detect rotation of the rear wheel 22 at each predetermined angle, and outputs a rectangular wave signal or a sine wave signal. From the output signal of the speed sensor 49, the calculation circuit 61 calculates a rotational speed of the rear wheel 22.

The gear position sensor 47 outputs data representing a gear position of the gearshift mechanism 28 to the calculation circuit 61. The gear position sensor 48 outputs data representing a gear position of the gearshift mechanism 29 to the calculation circuit 61. From the data representing the gear position, the calculation circuit 61 computes a gear ratio of the drivetrain between the crank shaft 57 and the drive shaft 26 of the rear wheel 22. Note that the calculation circuit 61 may compute the gear ratio from a rotational speed of the electric motor 53 and a velocity of travel of the vehicle body. The calculation circuit 61 computes the gear ratio by using an output signal from the motor rotation sensor 46 and an output signal from the speed sensor 49. In this case, the gear position sensors 47 and 48 may be omitted.

From the torque and rotational speed of the crank shaft 57, velocity of travel of the vehicle, gear ratio, the rider's switch manipulations on the manipulation device 80, information that is stored in the memory 62, etc., the calculation circuit 61 calculates a command value to generate a proper drive assisting output, and transmits it to the motor driving circuit 63. The calculation circuit 61 may calculate the command value by, for example, referring to a map which has been created based on, e.g., a relationship between the crank rotational output that is generated by the rider's human force applied to the pedals 55 and the drive assisting output that is generated by the electric motor 53. A plurality of types of maps are stored in the memory 62. The calculation circuit 61 may read from the memory 62 a map that is suited for the circumstances, and calculate the command value by referring to the map that has been read.

The motor driving circuit 63 may include, e.g., an inverter that supplies electric power, in accordance with the command value from the calculation circuit 61, from the battery 56 to the electric motor 53. With the supplied electric power, the electric motor 53 rotates and generates a predetermined drive assisting output. Thus, the calculation circuit 61 causes the electric motor 53 to generate a drive assisting output to assist with the rider's pedaling motion on the pedals 55 during travel.

Next, the display device 70 and the manipulation device 80 will be described in detail.

Figure 4:
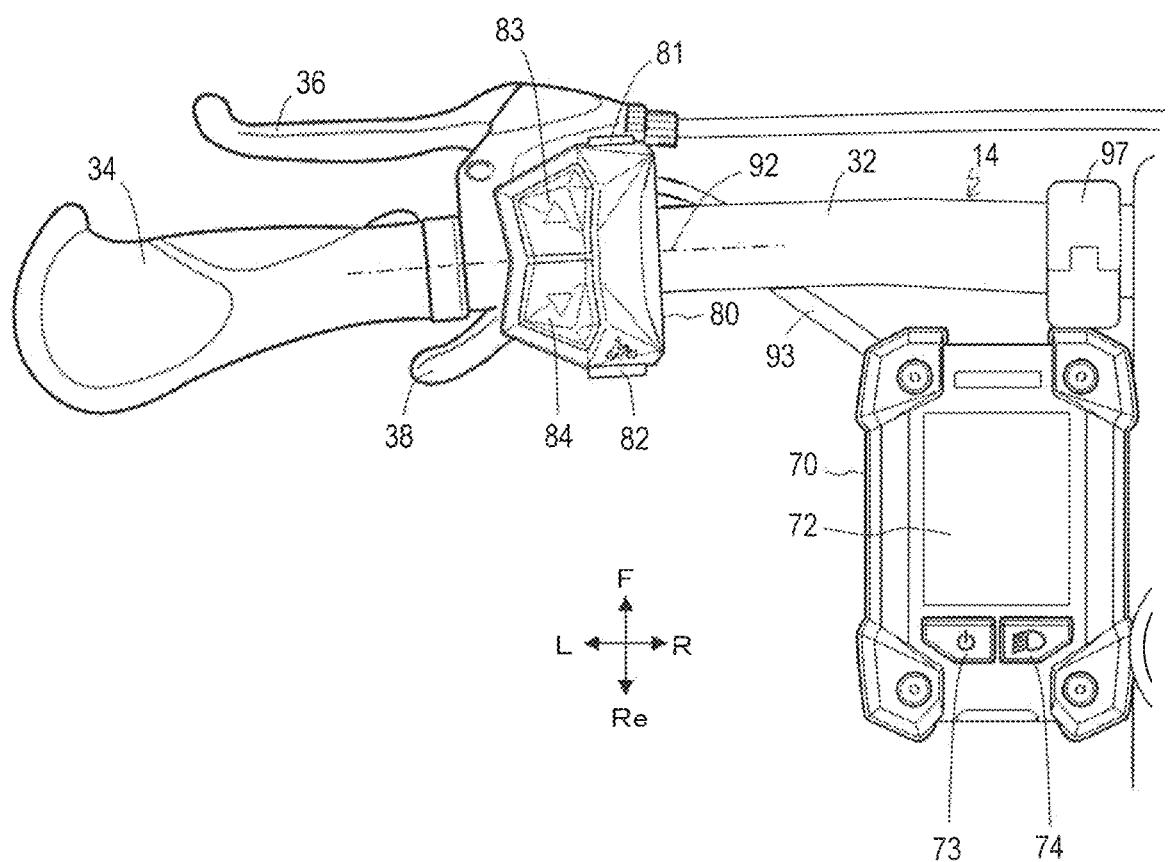
FIG. 4 is an upper plan view showing a display device and a manipulation device according to a preferred embodiment of the present invention.
Figure 5:
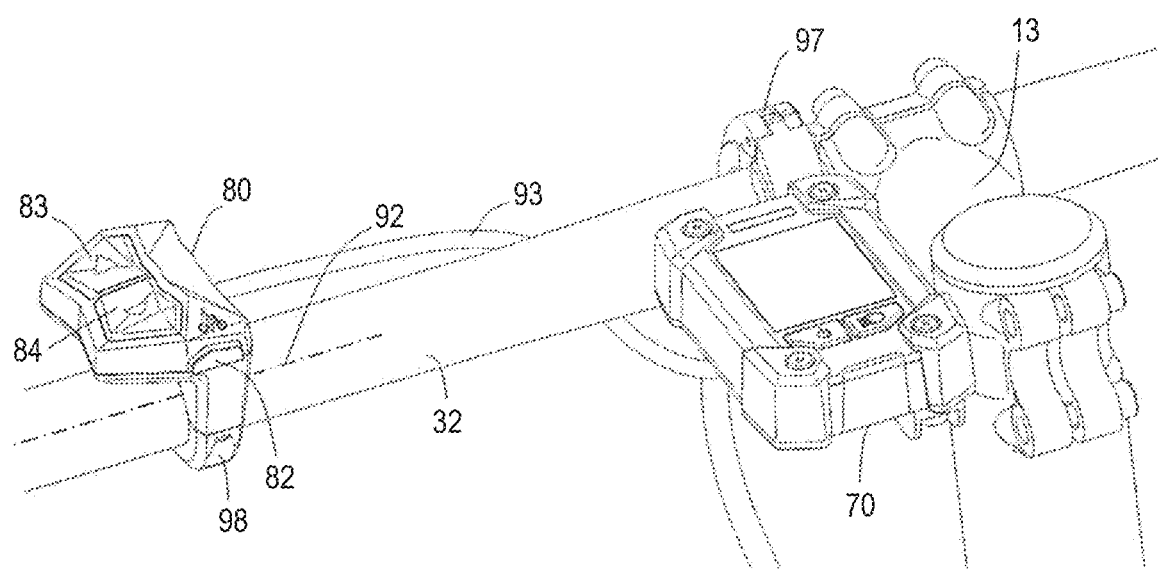
FIG. 5 is a perspective view of a display device and a manipulation device according to a preferred embodiment of the present invention.
Figure 5:
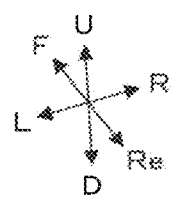
Figure 6:
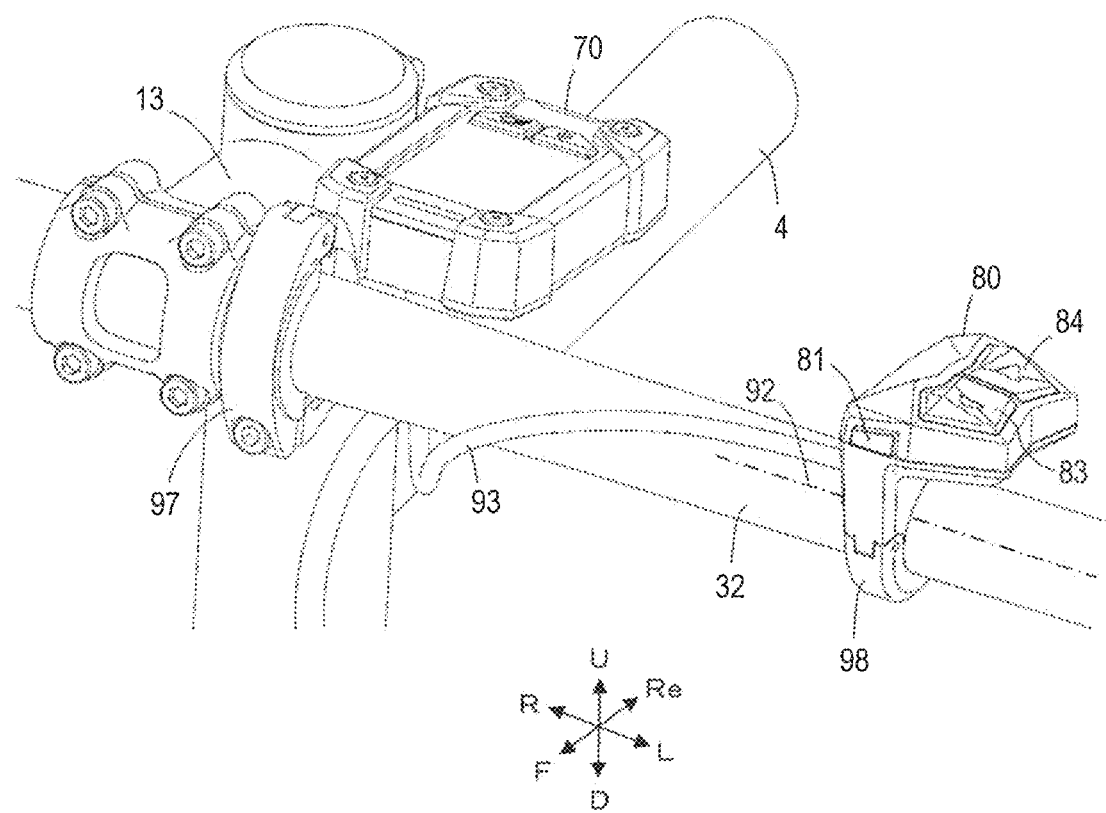
FIG. 6 is a perspective view of a display device and a manipulation device according to a preferred embodiment of the present invention.

FIG. 4 is an upper plan view of the display device 70 and the manipulation device 80. FIG. 5 is a perspective view showing the display device 70 and the manipulation device 80 as viewed obliquely from the rear left. FIG. 6 is a perspective view showing the display device 70 and the manipulation device 80 as viewed obliquely from the front left. For ease of explanation, the rear-wheel brake lever 36 and the gear shifter 38 are omitted from illustration in FIG. 5 and FIG. 6.

Figure 7:
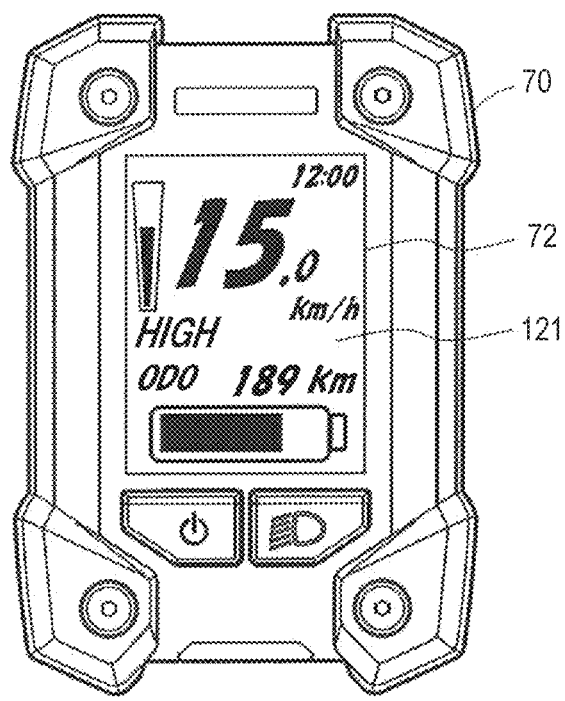
FIG. 7 is a diagram showing an example of information to be displayed by a display panel according to a preferred embodiment of the present invention.
Figure 8:
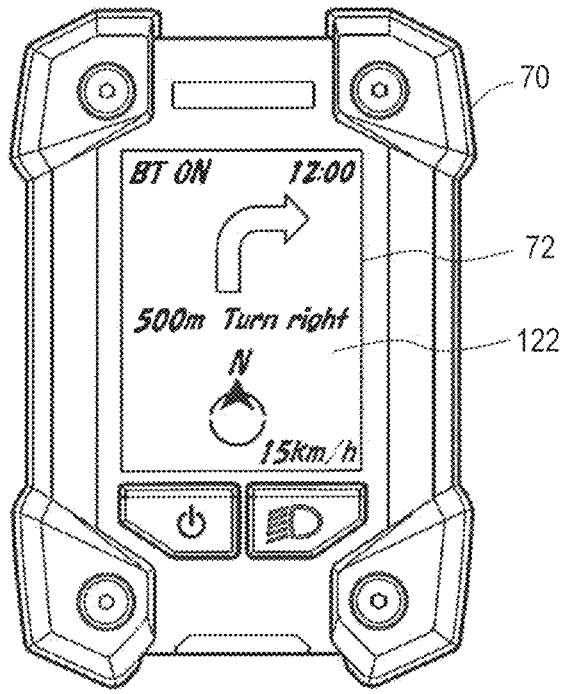
FIG. 8 is a diagram showing an example of information to be displayed by a display panel according to a preferred embodiment of the present invention.
Figure 9:
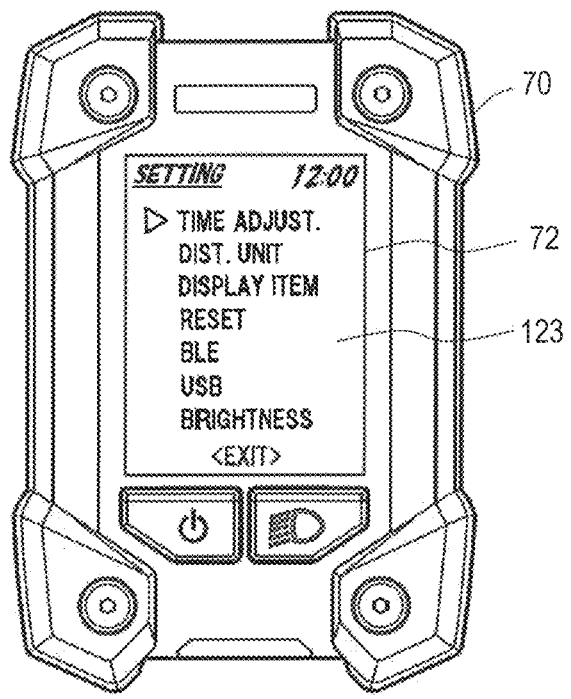
FIG. 9 is a diagram showing an example of information to be displayed by a display panel according to a preferred embodiment of the present invention.

The display device 70 includes a display panel 72, a power switch 73, and a lamp activation switch 74. The display panel 72, which may be, e.g., a liquid crystal panel, displays various information in accordance with the rider's manipulation on the manipulation device 80. FIG. 7, FIG. 8, and FIG. 9 show examples of information to be displayed by the display panel 72. Under a normal mode 121 as illustrated in FIG. 7, the time, the velocity of travel, the assist mode, an odometer, the remaining battery power, etc., are displayed on the display panel 72. In a navigation mode 122 shown in FIG. 8, guiding information as to a route from the current place to a destination is displayed on the display panel 72. Under a setup mode 123 shown in FIG. 9, various items to be set are displayed on the display panel 72. Without being limited to a liquid crystal panel, the display panel 72 may be an organic electro luminescence (EL) panel or an electronic paper panel, for example.

The power switch 73 powers ON or OFF the electric assist bicycle 1. The drive unit 51 operates while the electric assist bicycle 1 is in a powered ON state; while the electric assist bicycle 1 is in a powered OFF state, the drive unit 51 does not operate. The lamp activation switch 74 activates or deactivates the headlamp 2 (FIG. 1). When the lamp activation switch 74 is pressed to turn the headlamp 2 ON, the headlamp 2 emits light, thus illuminating the path ahead of the electric assist bicycle 1.

The manipulation device 80 is attached to the left handle bar 32 by using a clamp 98 (FIG. 5, FIG. 6). The manipulation device 80 includes an alternate switch 81, and operation switches 82, 83 and 84. The operation switches 82, 83 and 84 receive manipulations from the rider. The alternate switch 81 receives a manipulation of changing the functions to be assigned to the operation switches 82, 83 and 84 from the rider. In this example, the switches 81, 82, 83 and 84 are push button switches which will be pressed by a finger of the rider.

In this example, the operation switches 83 and 84 define assistance force setting switches with which to set an assistance force from the electric motor 53. The operation switch 82 defines a walk-along switch (Pushing assist switch) which receives from the rider an instruction to enter the walk-along mode to cause the electric motor 53 to generate an assistance force while the rider walks along with the electric assist bicycle 1. To "walk along" means for a rider to push forward the electric assist bicycle 1 without actually stepping on the pedals 55. An instance of walk-along is a motion of a rider who has gotten off the electric assist bicycle 1 and is pushing forward the electric assist bicycle 1 while walking on foot, in which the handle 14 is being pushed by the hands of the rider.

The assistance force setting switches 83 and 84 are used to set an assistance force of the electric motor 53, or an assist mode that corresponds to the magnitude of assistance force. The "assistance force" of the electric motor 53 is a force that will assist the human force. In this example, the electric assist bicycle 1 possesses a plurality of assist modes. The plurality of assist modes may be, for example, a no-assist mode, an eco mode, a normal mode, and a strong mode, this being an ascending order of intensity of the assistance force with respect to human force. In the no-assist mode, the electric motor 53 does not generate any assistance force.

If the rider clicks the assistance force setting switch 83 with a finger in the no-assist mode, then the no-assist mode is changed to the eco mode. A click means for the rider to press and immediately let go of the switch. For example, a click is a manipulation in which the rider presses the switch with a finger, and then releases the finger off the switch within 1 second, for example. If the rider clicks the assistance force setting switch 83 in the eco mode, then the eco mode is changed to the normal mode. If the rider clicks the assistance force setting switch 83 in the normal mode, then the normal mode is changed to the strong mode. Note that, even if the rider further clicks the assistance force setting switch 83 in the strong mode, the strong mode is maintained, and no further change occurs in the mode. On the other hand, if the assistance force setting switch 84 is clicked, as will be described next, the strong mode is changed to the normal mode.

Conversely to the assistance force setting switch 83, the assistance force setting switch 84 is clicked in order to select an assist mode with less assistance force. If the rider clicks the assistance force setting switch 84 in the strong mode, then the strong mode is changed to the normal mode. If the rider clicks the assistance force setting switch 84 in the normal mode, then the normal mode is changed to the eco mode. If the rider clicks the assistance force setting switch 84 in the eco mode, then the eco mode is changed to the no-assist mode. Even if the rider further clicks the assistance force setting switch 84 in the no-assist mode, the no-assist mode is maintained, and no further change occurs in the mode. If the assistance force setting switch 83 is clicked, the no-assist mode is changed to the eco mode.

Figure 10:
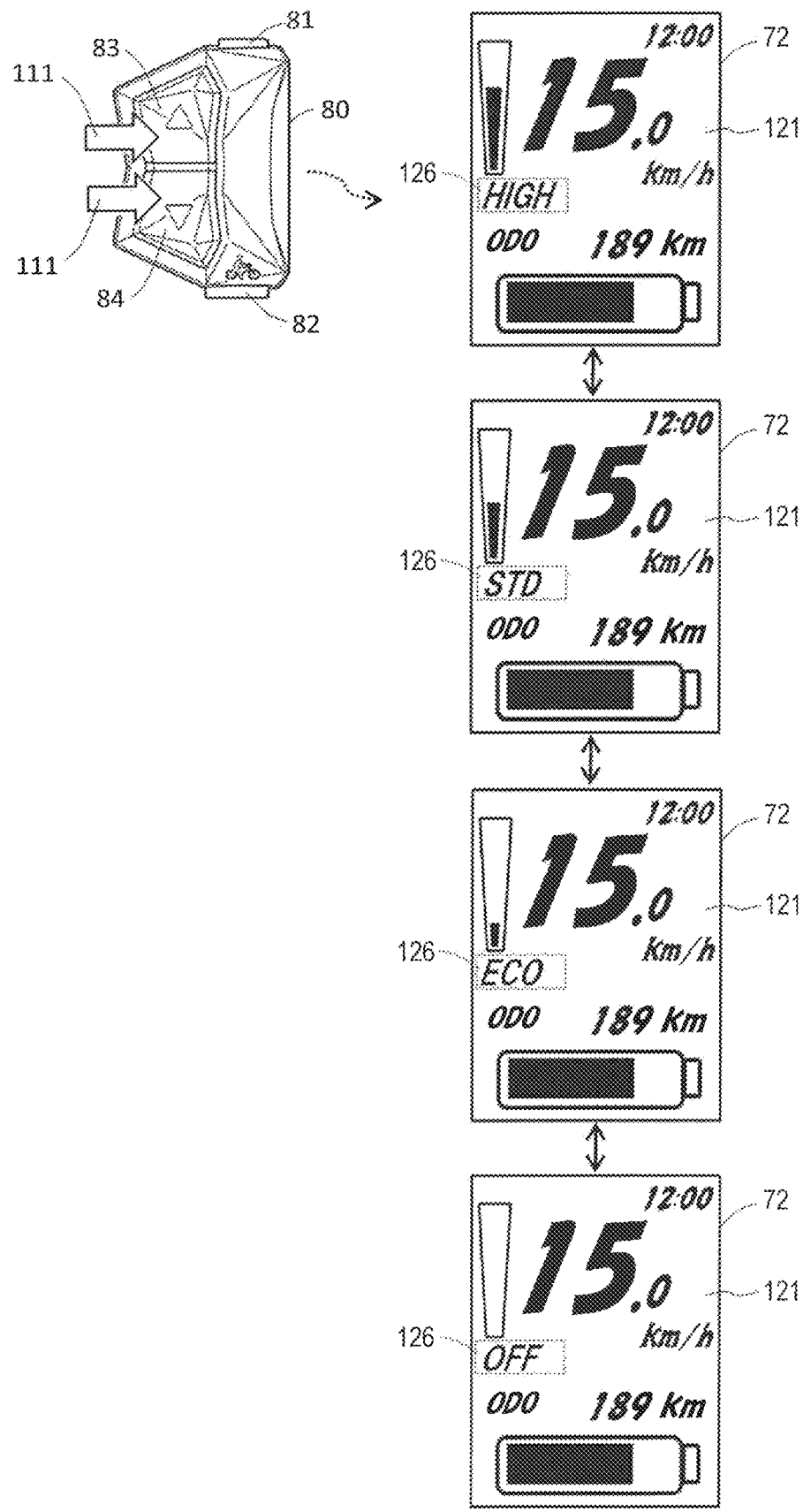
FIG. 10 is a diagram showing an assist mode which is selected by manipulating an assistance force setting switch according to a preferred embodiment of the present invention.

FIG. 10 is a diagram showing the display panel 72 displaying an assist mode that is selected by manipulating the assistance force setting switches 83 and 84. In the figure, blank arrows 111 indicate the rider's click operations to the switches.

When the rider clicks the assistance force setting switch 83 or 84 to select the normal mode, the text "STD", indicating that the normal mode has been set, is displayed in a display area 126 in the left portion of the display panel 72. When the rider clicks the assistance force setting switch 83 to select the strong mode, the text "HIGH", indicating that the strong mode has been set, is displayed in the display area 126. Similarly, when the rider clicks the assistance force setting switch 83 or 84 to select the eco mode, the text "ECO", indicating that the eco mode has been set, is displayed in the display area 126. When the rider clicks the assistance force setting switch 84 to select the no-assist mode, "OFF" is displayed in the display area 126 to indicate that the no-assist mode has been set. As the exact current assist mode is displayed in the display panel 72, the rider is able to know the current assist mode.

Although four assist modes are illustrated in the above example, there may be three or fewer assist modes, or five or more assist modes. For example, there may be a mode to generate an assistance force that is greater than that in the strong mode; or there may be more than one eco mode.

Figure 11:
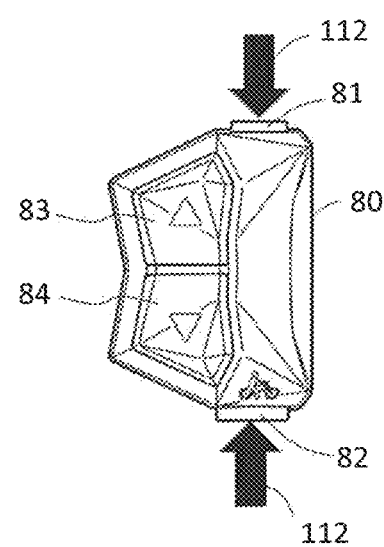
FIG. 11 is a diagram showing an exemplary manipulation of a manipulation device according to a preferred embodiment of the present invention.

Next, the walk-along mode is described. FIG. 11 is a diagram showing a manipulation in which the rider keeps pressing the walk-along switch 82 while keeping the alternate switch 81 pressed. In the figure, dark arrows 112 indicate the rider's manipulation of keeping the switches pressed. In this example, when the rider keeps pressing the walk-along switch 82 while keeping the alternate switch 81 pressed, the electric assist bicycle 1 enters the walk-along mode.

When the rider keeps pressing both of the alternate switch 81 and the walk-along switch 82 with fingers, while moving the electric assist bicycle 1 at a reduced speed with the hand(s) and without the feet stepping on the pedals 55, the controller 60 performs a control to cause the electric motor 53 to generate an assistance force. For example, the rider may keep pressing both of the alternate switch 81 and the walk-along switch 82 with the index finger and the thumb of the left hand, while pushing on the left grip 34 (FIG. 4) of the handle 14 with the left hand. To "move at reduced speed" means that the electric assist bicycle 1 is moving at a slow speed, e.g., greater than 0 km/h but smaller than about 6 km/h. Allowing the electric motor 53 to generate assistance force during a walk-along reduces the burden of the rider. For example, this reduces the burden of the rider when the rider is pushing forward the electric assist bicycle 1 with a hand while walking on foot and going up an ascent.

When the rider ceases to keep pressing at least one of the alternate switch 81 and the walk-along switch 82, the walk-along mode is ended.

In the above example, when the rider keeps pressing the walk-along switch 82 while keeping the alternate switch 81 pressed, the electric assist bicycle 1 enters the walk-along mode. This prevents the walk-along mode from being entered because of unintended touching of the walk-along switch 82 with a finger or luggage, etc.

Figure 12:
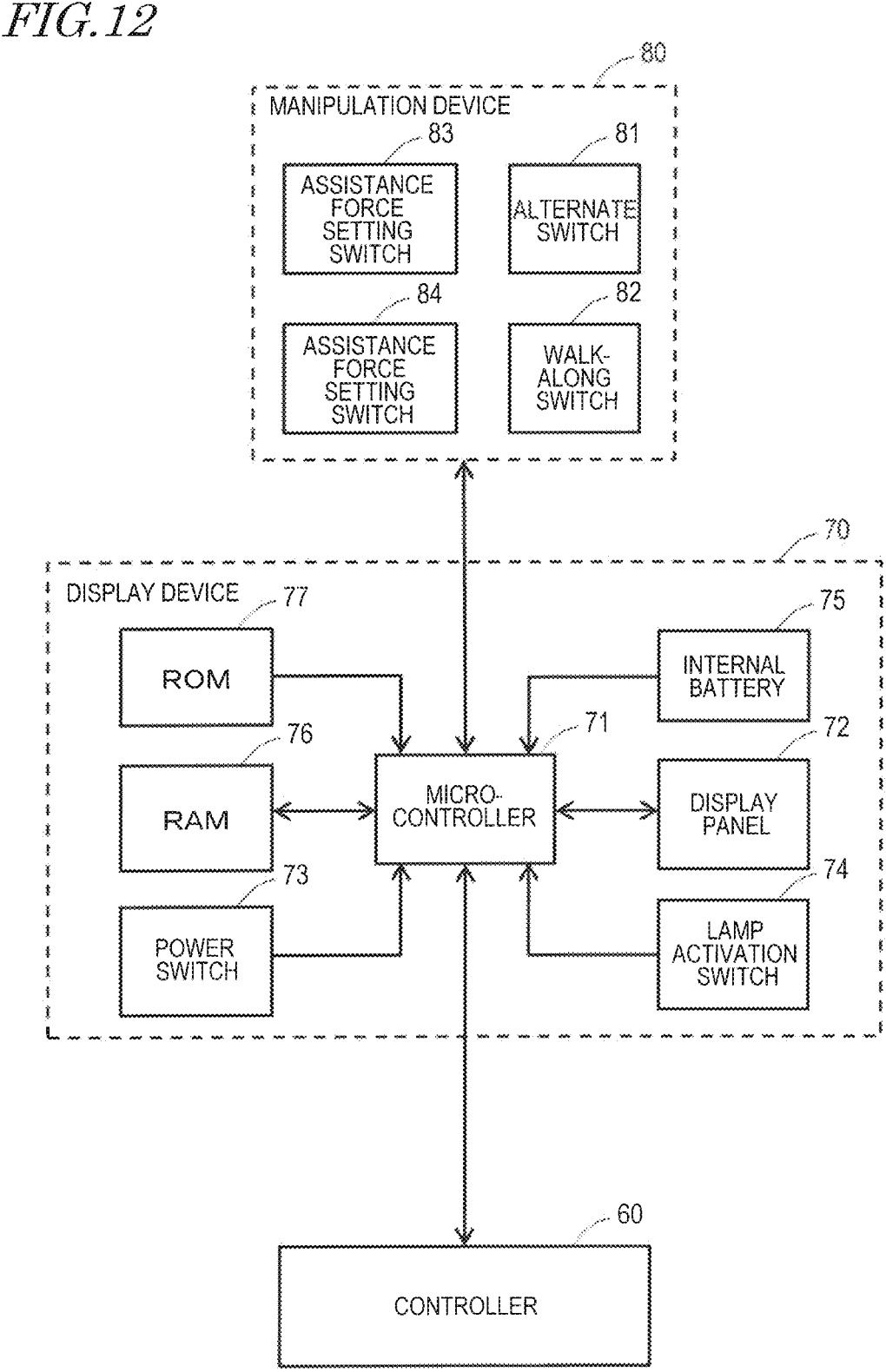
FIG. 12 is a hardware diagram of a display device and a manipulation device according to a preferred embodiment of the present invention.

FIG. 12 is a hardware diagram of the display device 70 and the manipulation device 80. The display device 70 includes a microcontroller 71, the display panel 72, the power switch 73, the lamp activation switch 74, an internal battery 75, a RAM 76, and a ROM 77.

The microcontroller 71 is a control circuit which controls the operation of the display device 70, and may be a semiconductor integrated circuit, for example. When the electric assist bicycle 1 is powered ON with the battery 56 attached thereto, the microcontroller 71 may operate by utilizing electric power which is supplied from the battery 56. The operation of the microcontroller 71 in a powered ON state may also utilize electric power from the internal battery 75. The internal battery 75 may be a primary battery such as a button battery, for example. The internal battery 75 may be a secondary battery that is capable of being charged.

The microcontroller 71 reads a computer program that is stored in the ROM 77, executes it in the RAM 76, and performs various processes of the display device 70. The RAM 76 and the ROM 77 may be built in the microcontroller 71.

The microcontroller 71 detects pressing of various switches of the display device 70 and the manipulation device 80. For example, as the rider begins pressing a switch, the microcontroller 71 detects a voltage value and/or a current value which is of a predetermined magnitude or higher. Then, as the switch ceases to be pressed, the microcontroller 71 detects that the voltage value and/or current value that has been detected now equals zero, for example. The microcontroller 71 is able to concurrently detect more than one switch being pressed.

The microcontroller 71 transmits to the controller 60 signals in response to pressing of various switches on the display device 70 and the manipulation device 80. For example, when the assistance force setting switches 83 and 84 are pressed, the microcontroller 71 transmits to the controller 60 a signal indicating that the assistance force setting switches 83 and 84 have been pressed. Having received the signal, the controller 60 sets an assist mode in accordance with the pressing of the assistance force setting switches 83 and 84, and performs a control to cause the electric motor 53 to generate an assistance force. Moreover, when both of the alternate switch 81 and the walk-along switch 82 are pressed, the microcontroller 71 transmits to the controller 60 a signal indicating that both of the alternate switch 81 and the walk-along switch 82 have been pressed. Having received the signal, the controller 60 enters the walk-along mode, and performs a control to cause the electric motor 53 to generate an assistance force. Note that, without involving the display device 70, the manipulation device 80 and the controller 60 may be connected via wiring lines; in this case, the controller 60 directly detects the rider's switch manipulation on the manipulation device 80.

Next, a manipulation of the manipulation device 80 using the alternate switch 81 will be described.

The alternate switch 81 receives from the rider a manipulation of changing the functions to be assigned to the operation switches 82, 83 and 84. Depending on whether the rider manipulates the operation switches 82, 83 and 84 in a state of keeping the alternate switch 81 manipulated or the rider manipulates the operation switches 82, 83 and 84 in a state of not manipulating the alternate switch 81, the microcontroller 71 causes the electric assist bicycle 1 to execute different operations. In the present preferred embodiment, the alternate switch 81 and the operation switches 82, 83 and 84 are push button switches, for example. For example, depending on whether the rider presses the operation switches 82, 83 and 84 in a state of keeping the alternate switch 81 pressed or the rider presses the operation switches 82, 83 and 84 in a state of not pressing the alternate switch 81, the microcontroller 71 causes the electric assist bicycle 1 to execute different operations. Examples of the operations to be executed by the electric assist bicycle 1 may include operation of the electric motor 53, setting of various modes, displaying operation of the display device 70, and so on.

As described above, when the rider presses the assistance force setting switch 83 or 84 in a state of not pressing the alternate switch 81, an operation of changing the assist mode is performed. When the rider keeps pressing the walk-along switch 82 while keeping the alternate switch 81 pressed, the walk-along mode is entered.

On the other hand, in a state in which the rider keeps pressing the alternate switch 81, the microcontroller 71 assigns functions that are different from changing the assist mode to the assistance force setting switches 83 and 84. On the other hand, in a state in which the rider is not pressing the alternate switch 81, the microcontroller 71 assigns a function that is different from the walk-along mode to the walk-along switch 82.

Figure 13:
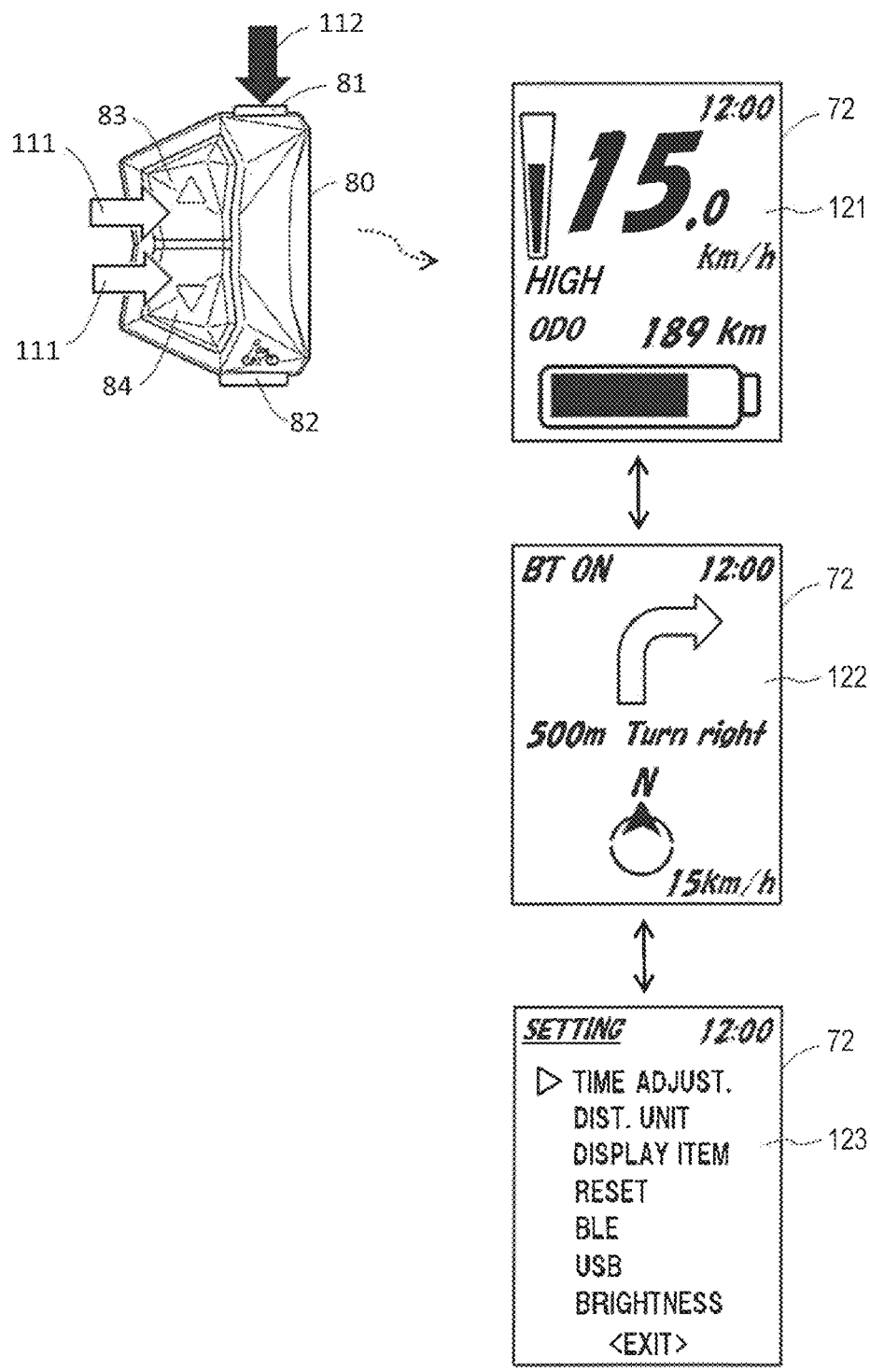
FIG. 13 is a diagram showing an exemplary operation of an electric assist bicycle when a rider presses an assistance force setting switch while keeping an alternate switch pressed according to a preferred embodiment of the present invention.

FIG. 13 is a diagram showing an exemplary operation of the electric assist bicycle 1 when the rider clicks the assistance force setting switch 83 or 84 in a state in which the rider keeps pressing the alternate switch 81. In the figure, blank arrows 111 indicate the rider's click operations to the switches. In the figure, a dark arrow 112 indicates the rider's manipulation of keeping the switches pressed. In the example shown in FIG. 13, when the rider clicks the assistance force setting switch 83 or 84 while keeping the alternate switch 81 pressed, the display mode of the display panel 72 is changed.

For example, when the indication on the display panel 72 is the normal mode 121, if the rider clicks the assistance force setting switch 84 while keeping the alternate switch 81 pressed, the microcontroller 71 changes the indication on the display panel 72 to the navigation mode 122. If the rider further clicks the assistance force setting switch 84 while keeping the alternate switch 81 pressed, the microcontroller 71 changes the indication on the display panel 72 to the setup mode 123. Conversely, when the indication on the display panel 72 is the setup mode 123, if the rider clicks the assistance force setting switch 83 while keeping the alternate switch 81 pressed, the microcontroller 71 changes the indication on the display panel 72 to the navigation mode 122. If the rider further clicks the assistance force setting switch 83 while keeping the alternate switch 81 pressed, the microcontroller 71 changes the indication on the display panel 72 to the normal mode 121.

If the rider ceases to press the alternate switch 81, the microcontroller 71 sets the currently-existing display mode as the selected display mode, and the display panel 72 continues to display this display mode having been set. Moreover, once the alternate switch 81 ceases to be pressed, the microcontroller 71 changes the functions of the assistance force setting switches 83 and 84 back to the function of assist mode changes.

Figure 14:
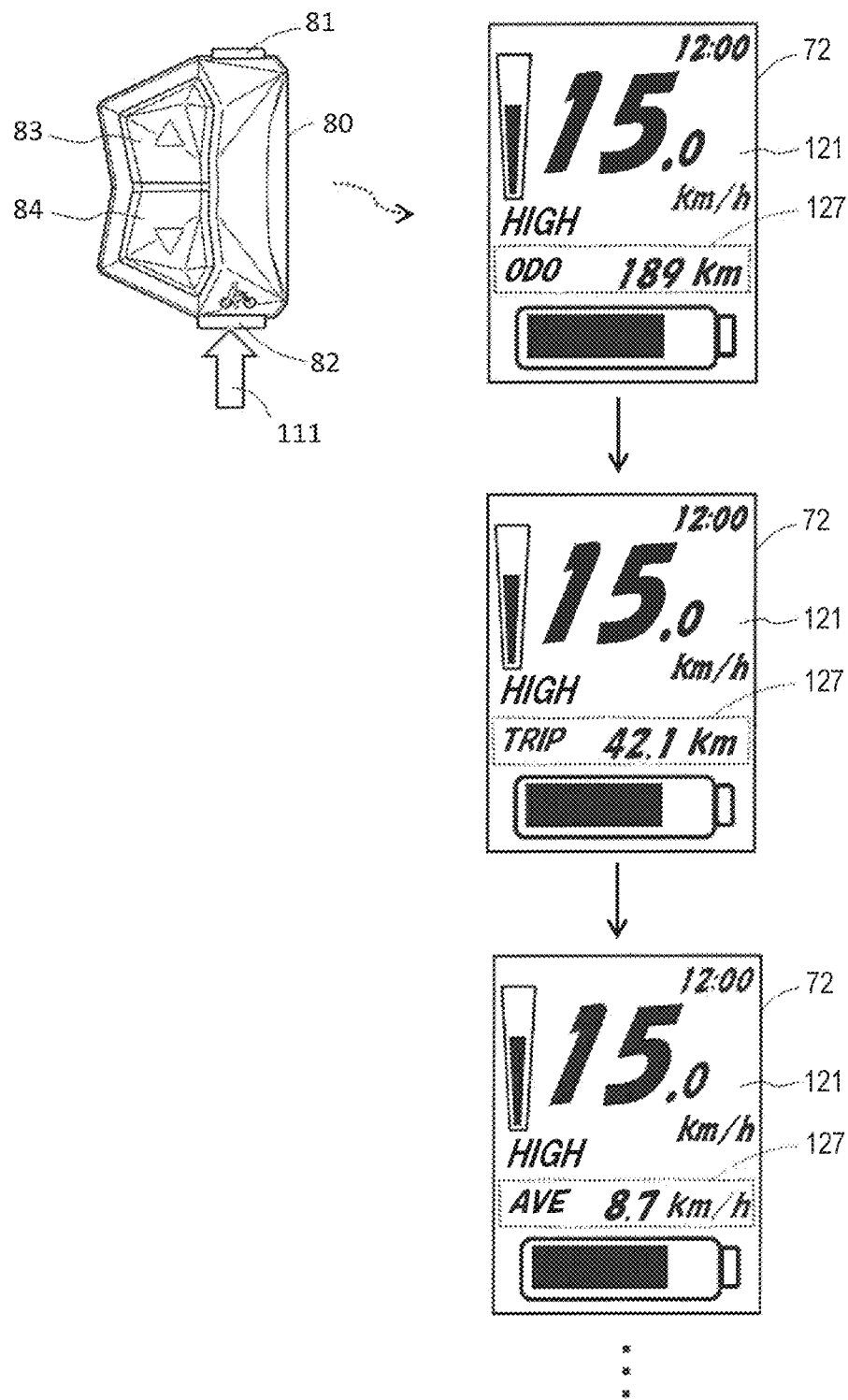
FIG. 14 is a diagram showing an exemplary operation of an electric assist bicycle when a walk-along switch is pressed by a rider according to a preferred embodiment of the present invention.
Figure 15:
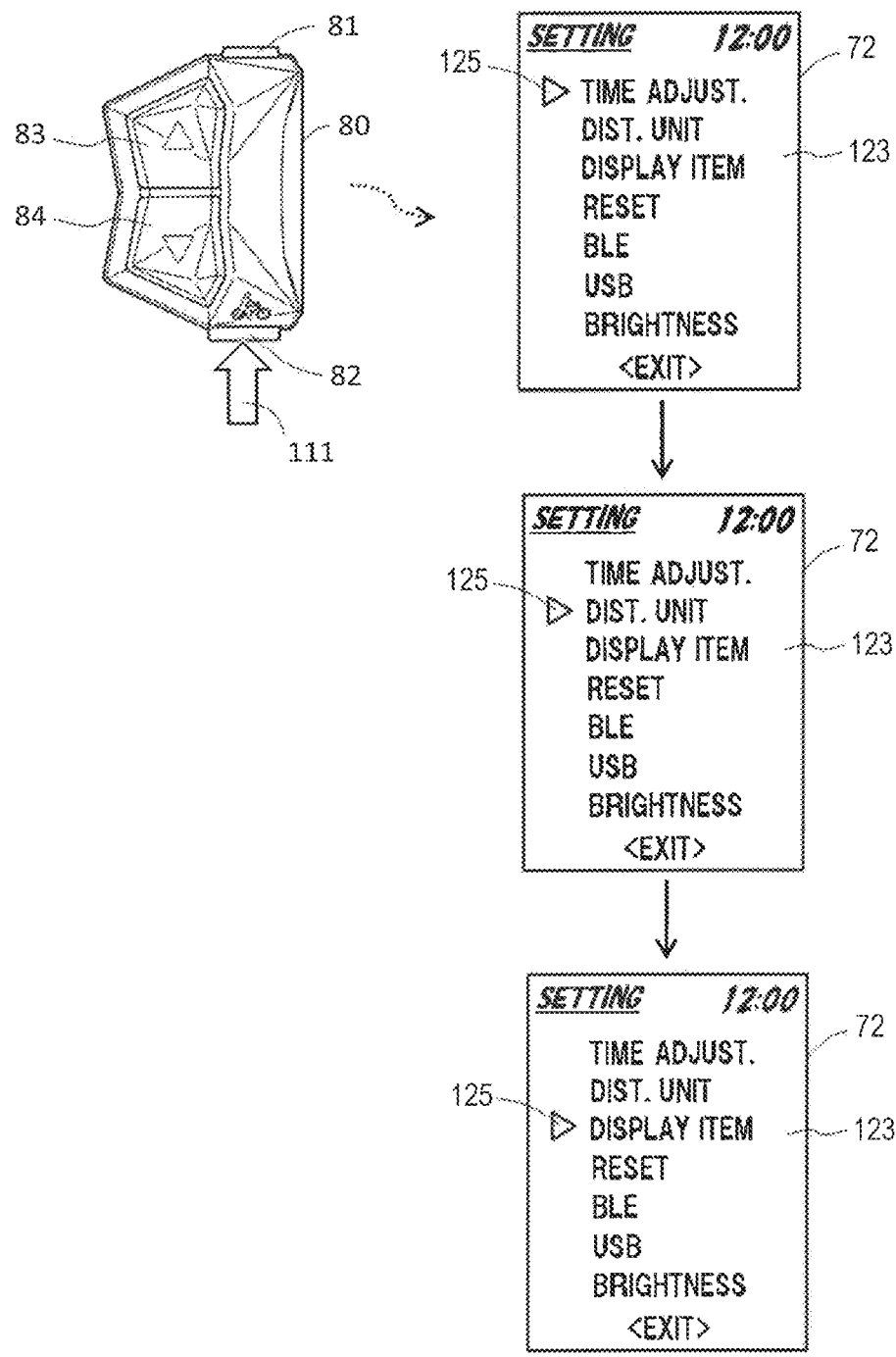
FIG. 15 is a diagram showing an exemplary operation of an electric assist bicycle when a walk-along switch is pressed by a rider according to a preferred embodiment of the present invention.

FIG. 14 and FIG. 15 are diagrams showing an exemplary operation of the electric assist bicycle 1 when the rider has pressed the walk-along switch 82 in a state of not pressing the alternate switch 81.

FIG. 14 shows an exemplary operation in the case in which the indication on the display panel 72 is the normal mode 121. In the normal mode 121, multiple kinds of information are able to be displayed in a display area 127 of the display panel 72, e.g., an odometer, a trip meter, average speed, maximum speed, cadence, or the like.

For example, when an odometer is displayed in the display area 127 as exemplified by "ODO 189 km" in the figure, if the rider clicks the walk-along switch 82 without pressing the alternate switch 81, the microcontroller 71 changes the information to be displayed in the display area 127 to a trip meter. In the example of FIG. 14, "TRIP 42.1 km" is displayed as the trip meter. If the rider further clicks the walk-along switch 82 without pressing the alternate switch 81, the microcontroller 71 changes the information to be displayed in the display area 127 to an average speed. In the example of FIG. 14, "AVE 8.7 km/h" is displayed as the average speed. Similarly, every time the rider clicks the walk-along switch 82 without pressing the alternate switch 81, the information to be displayed in the display area 127 sequentially changes from maximum speed to cadence, . . . , etc., until displaying the last information, after which the odometer indication is resumed.

FIG. 15 shows an exemplary operation in the case in which the indication on the display panel 72 is the setup mode 123. When the setup mode 123 is selected, various items that are capable of being set, e.g., clock adjustment, toggling of the distance unit, selection of displayed items, are displayed on the display panel 72. In the example shown in FIG. 15, immediately after changing to the setup mode 123 from another display mode, a cursor 125 is displayed at a position pointing to the clock adjustment item on the display panel 72.

If the rider clicks the walk-along switch 82 without pressing the alternate switch 81, the microcontroller 71 moves the displayed position of the cursor 125, thus changing the item that the cursor 125 points to. For example, as shown in FIG. 15, the item that the cursor 125 points to may be changed from the clock adjustment item to the toggling-of-the-distance-unit item. Every time the rider clicks the walk-along switch 82 without pressing the alternate switch 81, the item that the cursor 125 points to sequentially changes, and after the cursor 125 points to the last item, it returns to the position pointing to the clock adjustment item.

Now, if the rider long-presses the alternate switch 81 without pressing the walk-along switch 82, for example, the microcontroller 71 selects the item that is currently pointed to by the cursor 125. A long-press means a manipulation in which the rider keep pressing the switch with a finger for several seconds (e.g., 2 to 3 seconds) and then releases the finger off the switch. For example, if the clock adjustment item is selected, the indication on the display panel 72 transitions to the clock adjustment mode. Under the clock adjustment mode, for example, hour adjustment and minute adjustment may toggle every time the walk-along switch 82 is clicked. Moreover, the hour and minute values are adjusted by clicking the assistance force setting switches 83 and 84. Once the alternate switch 81 is clicked, the indication on the display panel 72 returns to the setup mode 123.

When the indication on the display panel 72 is the navigation mode 122, for example, if the rider clicks the walk-along switch 82 without pressing the alternate switch 81, a camera shutter may be released. If the display device 70 has an internal camera, that camera may be used to perform imaging and recording of the surrounding scenery. The type of the camera may be arbitrary, including, for example: a camera that is internal to a mobile terminal device that has been attached to the electric assist bicycle 1, e.g., a smartphone; or a wearable camera that is being worn by the rider. For example, the display device 70 may perform wireless communications with any such camera, and camera manipulations may be made by using the manipulation device 80.

Note that the electric assist bicycle 1 may not execute anything in response to the rider's manipulation of clicking the walk-along switch 82 without pressing the alternate switch 81. Such an implementation also falls under the meaning that the electric assist bicycle executes different operations depending on whether the rider keeps the alternate switch 81 pressed or is not pressing it. In other words, in the present preferred embodiment, operating and non-operating also qualify as mutually different operations.

As described above, in the present preferred embodiment, the functions to be assigned to the operation switches 82, 83 and 84 are altered depending on whether the rider keeps the alternate switch 81 pressed or is not pressing it. This allows the operation switches 82, 83 and 84 disposed on the handle 14 of the electric assist bicycle 1 to respectively provide a plurality of functions, thus making it possible to receive many kinds of instructions from the rider while reducing the number of switches. By reducing the number of switches, downsizing of the manipulation device 80 is realized, and the design freedom is improved.

Next, the locations of the alternate switch 81 and the operation switches 82, 83 and 84 will be described.

Figure 16:
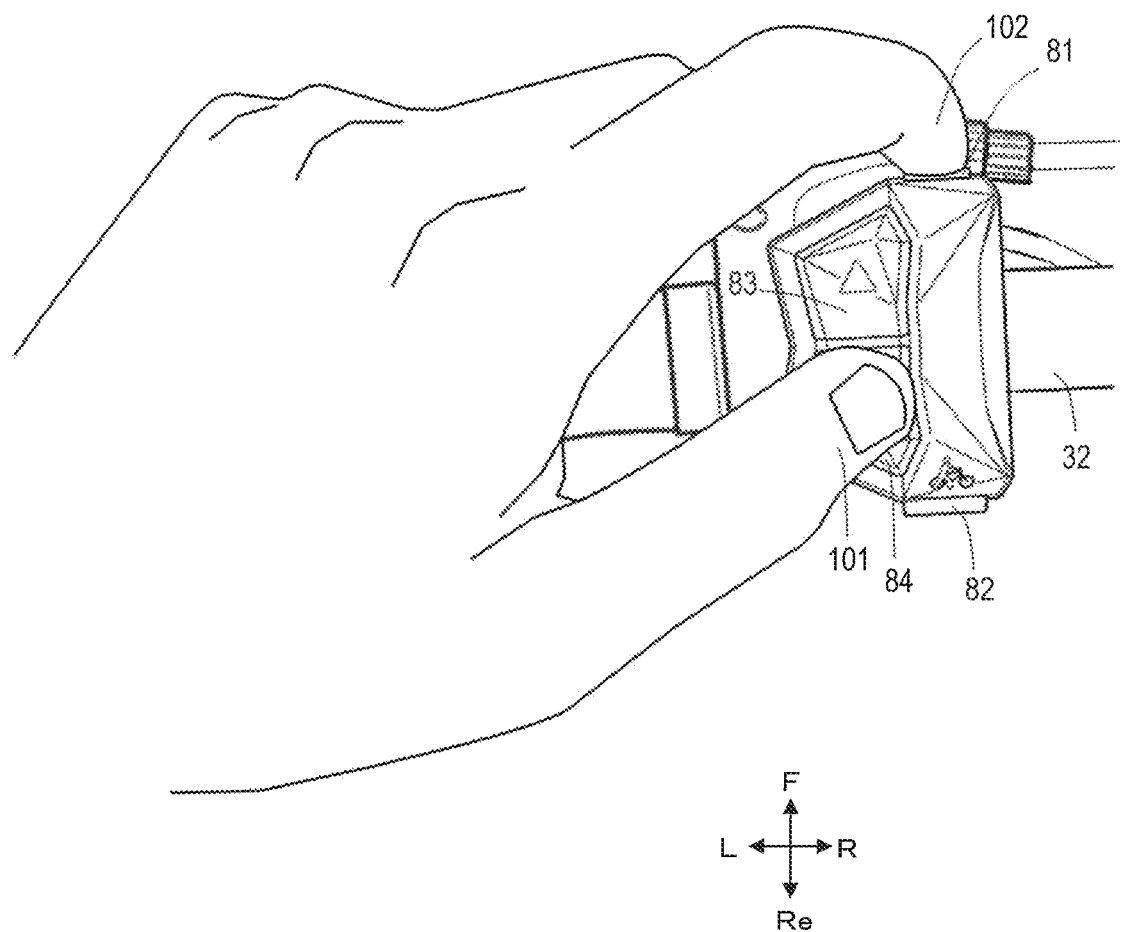
FIG. 16 is a diagram showing a manipulation in which a rider presses an assistance force setting switch with a thumb while keeping an alternate switch pressed with an index finger according to a preferred embodiment of the present invention.
Figure 17:
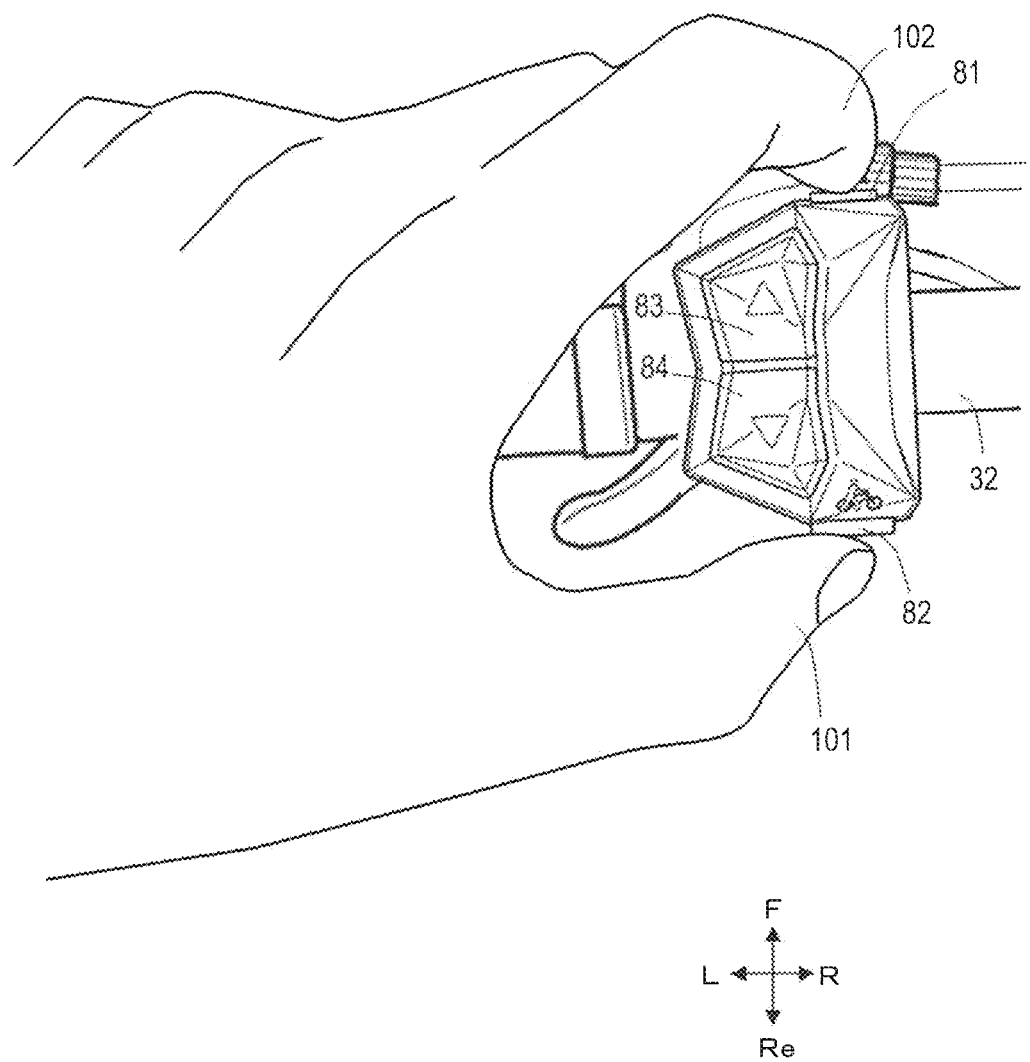
FIG. 17 is a diagram showing a manipulation in which a rider keeps a walk-along switch pressed with a thumb while keeping an alternate switch pressed with an index finger according to a preferred embodiment of the present invention.

FIG. 16 is a diagram showing a switch manipulation in which the rider clicks the assistance force setting switch 84 with a thumb 101 while keeping the alternate switch 81 pressed with an index finger 102. FIG. 17 is a diagram showing a switch manipulation in which the rider keeps pressing the walk-along switch 82 with the thumb 101 while keeping the alternate switch 81 pressed with the index finger 102.

With reference to FIG. 4, FIG. 5, and FIG. 6, in the present preferred embodiment, the alternate switch 81 is disposed forward of the operation switches 82, 83 and 84. This allows the rider to easily perform simultaneous manipulations of one of the operation switches 82, 83 and 84 and the alternate switch 81 with two fingers. For example, as shown in FIG. 16 and FIG. 17, it is easy to manipulate the operation switches 82, 83 and 84 with the thumb while manipulating the alternate switch 81 with the index finger or the middle finger. Since this structure allows the operation switches 82, 83 and 84 to be easily manipulated in a state of keeping the alternate switch 81 manipulated, the rider is able to quickly perform the manipulation of changing the functions to be assigned to the operation switches 82, 83 and 84.

Moreover, the alternate switch 81 and the walk-along switch 82 are disposed so that, when the handle 14 is in a neutral position, the alternate switch 81 and the walk-along switch 82 have a mutually overlapping positional relationship along the front-rear direction (F-Re direction in the figure) of the electric assist bicycle 1. The neutral position of the handle 14 is the position of the handle 14 while the electric assist bicycle 1 is traveling straight on a flat road. With such a positional relationship between the alternate switch 81 and the walk-along switch 82, it is easy to manipulate the walk-along switch 82 with the thumb while manipulating the alternate switch 81 with the index finger or the middle finger. As a result, the rider is able to easily perform the manipulation to cause the electric assist bicycle 1 to enter the walk-along mode.

Moreover, the alternate switch 81 may be disposed forward of an axial center 92 of the left handle bar 32, at the position on the left handle bar 32 where the manipulation device 80 is disposed. In any bicycle body structure where the rider will be steering while gripping the handle 14 with both hands, the left hand of the rider is at a position for gripping the left grip 34 of the handle 14. The operation switches 82, 83 and 84 of the manipulation device 80, which are disposed near the left grip 34, can be manipulated by being pressed with the thumb 101 of the left hand, for example. In the meantime, manipulating the alternate switch 81 with a finger other than the thumb 101 can facilitate simultaneous manipulations of the operation switches 82, 83 and 84 and the alternate switch 81. By disposing the alternate switch 81 forward of the axial center 92, as shown in FIG. 16 and FIG. 17, manipulation of the alternate switch 81 with a finger other than the thumb 101, e.g., the index finger 102, is facilitated. Since the structure facilitates manipulation of the operation switches 82, 83 and 84 while keeping the alternate switch 81 pressed, the rider is able to quickly perform the manipulation of changing the functions to be assigned to the operation switches 82, 83 and 84 with one hand.

In this example, the assistance force setting switches 83 and 84 are disposed above the alternate switch 81. By disposing the alternate switch 81 forward of the assistance force setting switches 83 and 84, and disposing the assistance force setting switches 83 and 84 above the alternate switch 81, simultaneous manipulations of the alternate switch 81 and the assistance force setting switches 83 and 84 with the index finger 102 and the thumb 101 is further facilitated.

In this example, the walk-along switch 82 is disposed rearward of the axial center 92. By disposing the alternate switch 81 forward of the axial center 92 and disposing the walk-along switch 82 rearward of the axial center 92, simultaneous manipulations of the alternate switch 81 and the walk-along switch 82 with the index finger 102 and the thumb 101 is further facilitated as shown in FIG. 17.

In the above example, when the rider performs a manipulation of keeping the alternate switch 81 pressed, the functions to be assigned to the operation switches 82, 83 and 84 are altered. When the rider performs any manipulation for the alternate switch 81 other than a manipulation of keeping it pressed, further alternative functions may be assigned to the operation switches 82, 83 and 84. For example, in the case in which the electric assist bicycle 1 includes an electric shifter, if the rider double-clicks the alternate switch 81 and then clicks the assistance force setting switch 83 or 84, the gear position of the electric shifter may be changed. Moreover, if the rider long-presses the alternate switch 81 and then clicks the assistance force setting switch 83 or 84, the output characteristics of the electric motor 53 may be changed within the same assist mode.

If the rider performs a manipulation of keeping the alternate switch 81 pressed after clicking the alternate switch 81 once, for example, further alternative functions may be assigned to the operation switches 82, 83 and 84. If the rider performs a manipulation of keeping the alternate switch 81 pressed after clicking the alternate switch 81 n times, for example, further alternative functions may be assigned to the operation switches 82, 83 and 84. Herein, n is an integer of 2 or greater. In this case, the functions to be assigned to the operation switches 82, 83 and 84 may be altered depending on the number of times the alternate switch 81 was clicked immediately before the manipulation of keeping the alternate switch 81 pressed.

Thus, since the alternate switch 81 is able to receive multiple kinds of manipulations from the rider, the rider is able to assign more functions to the operation switches 82, 83 and 84. Thus, while reducing the number of switches to be provided on the handle 14 of the electric assist bicycle 1, it is possible to receive many kinds of instructions from the rider.

In the above example, the electric assist bicycle 1 enters the walk-along mode when the rider keeps pressing the walk-along switch 82 while keeping the alternate switch 81 pressed. In another example operation, the walk-along mode may be entered when the rider keeps pressing the walk-along switch 82 without pressing the alternate switch 81. In this case, in a state in which the rider keeps pressing the alternate switch 81, the microcontroller 71 assigns a function that is different from the walk-along mode to the walk-along switch 82.

Figure 18:
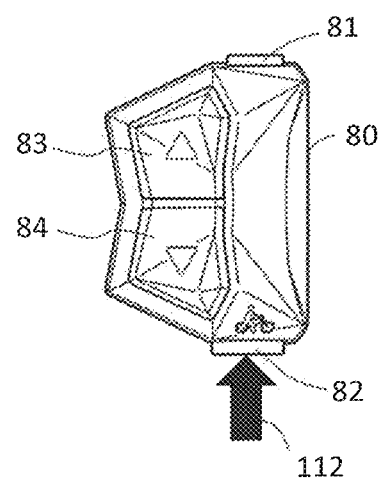
FIG. 18 is a diagram showing an exemplary manipulation of a manipulation device according to a preferred embodiment of the present invention.

FIG. 18 is a diagram showing the rider's manipulation of keeping the walk-along switch 82 pressed without pressing the alternate switch 81. In this example, if the rider keeps pressing the walk-along switch 82 without pressing the alternate switch 81, the electric assist bicycle 1 enters the walk-along mode.

When the rider keeps pressing the walk-along switch 82 with a finger, while moving the electric assist bicycle 1 at reduced speed with a hand(s) and without the feet stepping on the pedals 55, the microcontroller 71 transmits to the controller 60 a signal indicating that the walk-along switch 82 is kept pressed, for example. Having received the signal, the controller 60 enters the walk-along mode, and performs a control to cause the electric motor 53 to generate an assistance force. For example, the rider may keep pressing the walk-along switch 82 with the thumb of the left hand, while pushing on the left grip 34 (FIG. 4) of the handle 14 with the left hand.

Once the rider ceases to keep pressing the walk-along switch 82, the walk-along mode is ended.

Figure 19:
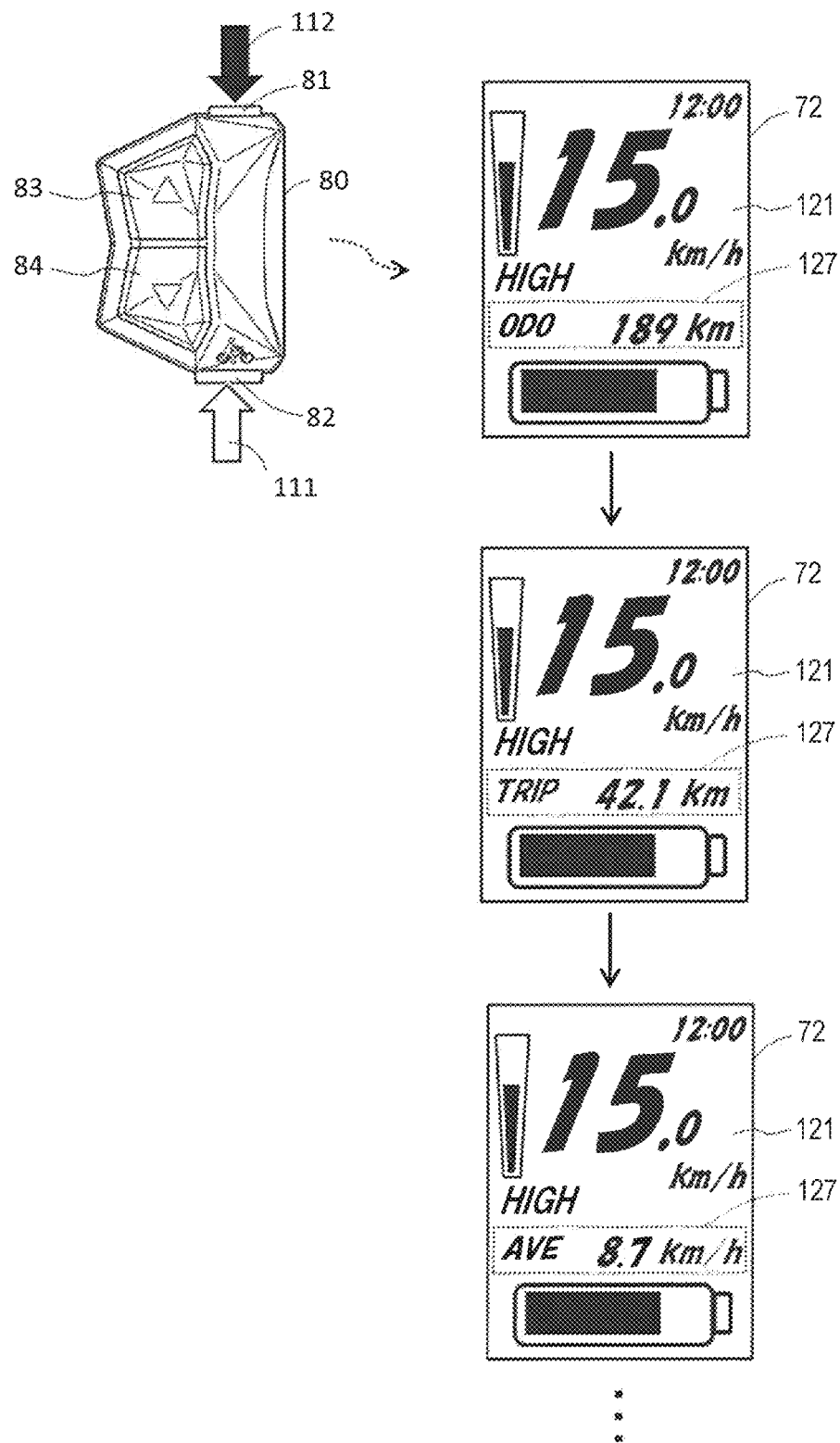
FIG. 19 is a diagram showing an exemplary operation of an electric assist bicycle when a rider presses a walk-along switch while keeping an alternate switch pressed according to a preferred embodiment of the present invention.
Figure 20:
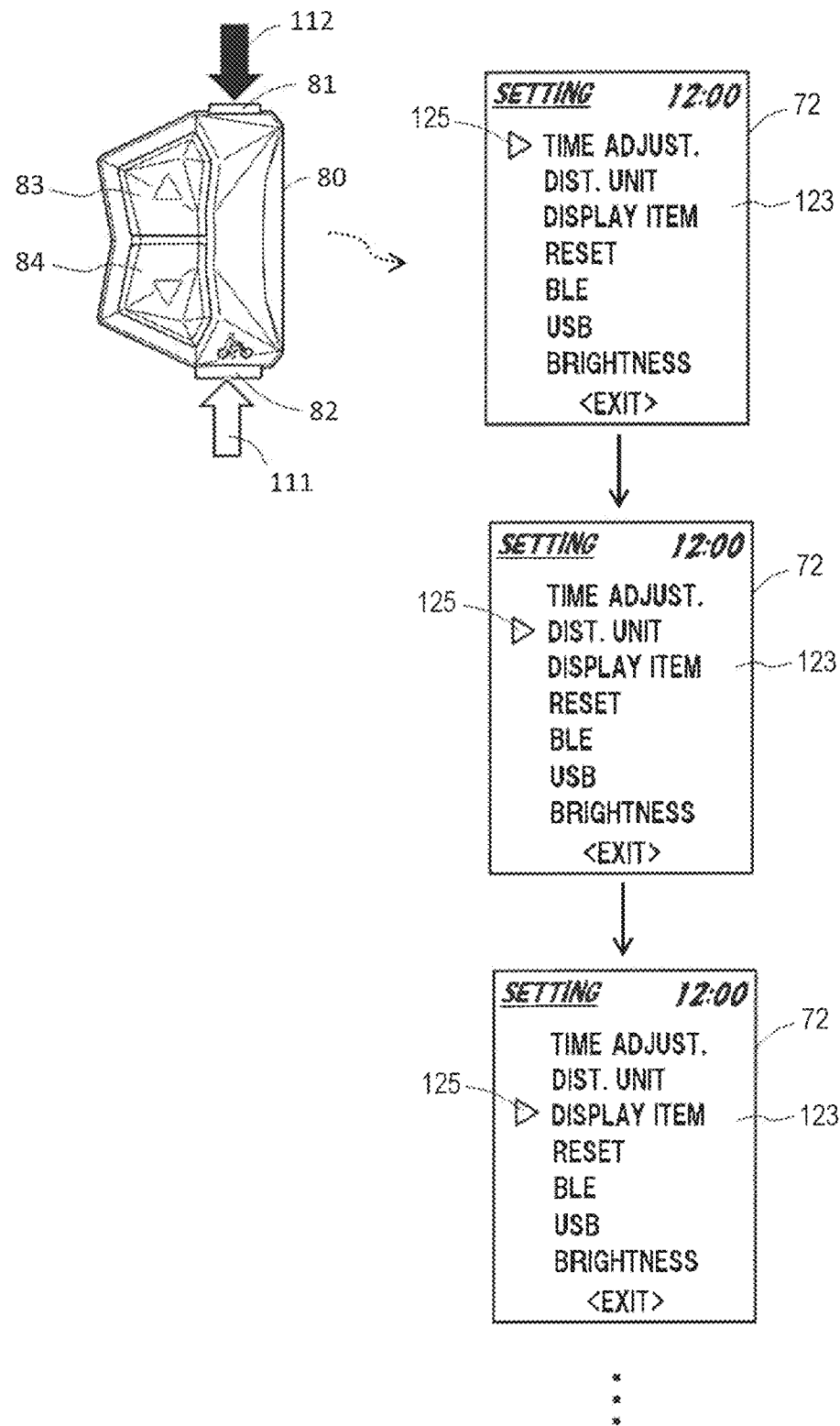
FIG. 20 is a diagram showing an exemplary operation of an electric assist bicycle when a rider presses a walk-along switch while keeping an alternate switch pressed according to a preferred embodiment of the present invention.

FIG. 19 and FIG. 20 are diagrams showing an exemplary operation of the electric assist bicycle 1 in the case in which the rider presses the walk-along switch 82 in a state in which the rider keeps pressing the alternate switch 81.

FIG. 19 shows an exemplary operation in the case in which the indication on the display panel 72 is the normal mode 121. For example, when an odometer is displayed in the display area 127 as exemplified by "ODO 189 km" in the figure, if the rider clicks the walk-along switch 82 while keeping the alternate switch 81 pressed, the microcontroller 71 changes the information to be displayed in the display area 127 to a trip meter. In the example of FIG. 19, "TRIP 42.1 km" is displayed as the trip meter. If the rider further clicks the walk-along switch 82 while keeping the alternate switch 81 pressed, the microcontroller 71 changes the information to be displayed in the display area 127 to an average speed. In the example of FIG. 19, "AVE 8.7 km/h" is displayed as the average speed. Similarly, every time the rider clicks the walk-along switch 82 while keeping the alternate switch 81 pressed, the information to be displayed in the display area 127 consecutively changes from maximum speed to cadence, . . . , etc., until displaying the last information, after which the odometer indication is resumed.

If the rider ceases to press the alternate switch 81, the microcontroller 71 continues to display the item that has been displayed in the display area 127. Moreover, once the alternate switch 81 ceases to be pressed, the microcontroller 71 changes the function of the walk-along switch 82 back to the function of receiving an instruction to enter the walk-along mode from the rider.

FIG. 20 shows an exemplary operation in the case in which the indication on the display panel 72 is the setup mode 123. In the example shown in FIG. 20, immediately after changing to the setup mode 123 from another display mode, the cursor 125 is displayed at a position pointing to the clock adjustment item on the display panel 72.

If the rider clicks the walk-along switch 82 while keeping the alternate switch 81 pressed, the microcontroller 71 moves the displayed position of the cursor 125, thus changing the item that the cursor 125 points to. For example, as shown in FIG. 20, the item that the cursor 125 points to may be changed from the clock adjustment item to the toggling-of-the-distance-unit item. Every time the rider clicks the walk-along switch 82 while keeping the alternate switch 81 pressed, the item that the cursor 125 points to sequentially changes, and after the cursor 125 points to the last item, it returns to the position pointing to the clock adjustment item.

If the rider ceases to press the alternate switch 81, the microcontroller 71 selects the item that is currently pointed to by the cursor 125. For example, if the clock adjustment item is selected, the indication on the display panel 72 transitions to the clock adjustment mode. Under the clock adjustment mode, for example, hour adjustment and minute adjustment may toggle every time the walk-along switch 82 is clicked. Moreover, the hour and minute values are adjusted by clicking the assistance force setting switches 83 and 84. Once the alternate switch 81 is clicked, the indication on the display panel 72 returns to the setup mode 123.

When the indication on the display panel 72 is the navigation mode 122, for example, if the rider clicks the walk-along switch 82 while keeping the alternate switch 81 pressed, a camera shutter may be released.

Figure 21:
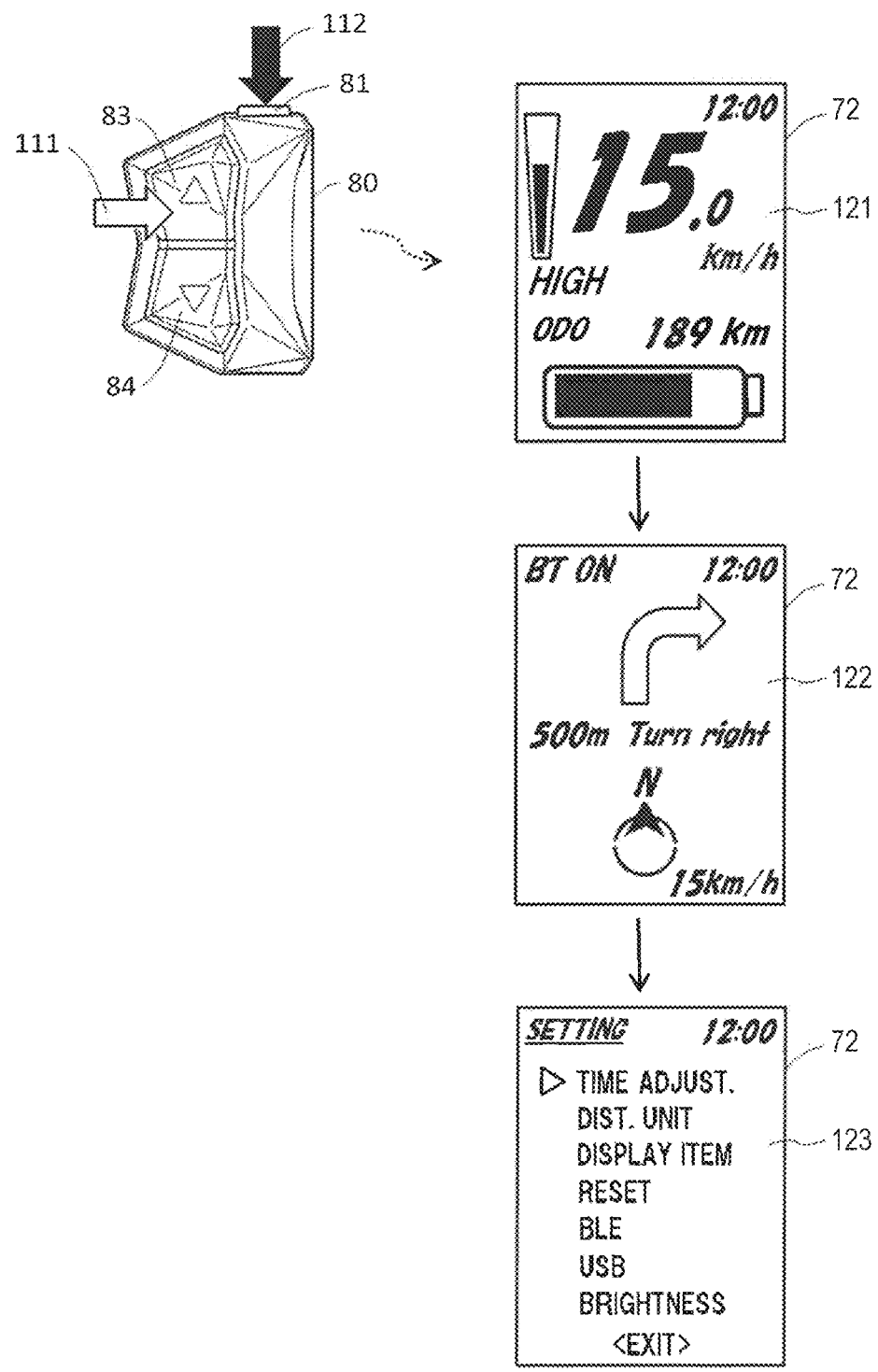
FIG. 21 is a diagram showing a variant of a manipulation device according to a preferred embodiment of the present invention.
Figure 22:
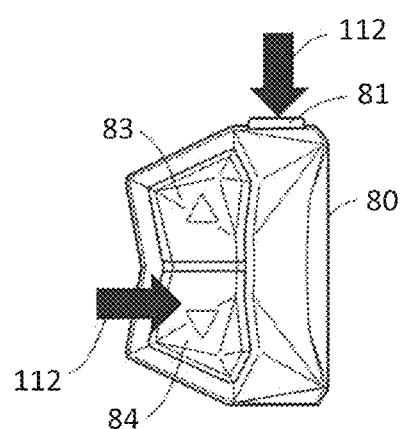
FIG. 22 is a diagram showing a variant of a manipulation device according to a preferred embodiment of the present invention.

Next, variants of the electric assist bicycle 1 according to the present preferred embodiment will be described. FIG. 21 and FIG. 22 are diagrams showing variants of the manipulation device 80 included in the electric assist bicycle 1. In this example, the manipulation device 80 lacks the walk-along switch 82.

When the assistance force setting switch 83 or 84 is clicked in a state in which the rider is not pressing the alternate switch 81, an operation of changing the assist mode is performed as described above. In a state in which the rider keeps pressing the alternate switch 81, the microcontroller 71 assigns functions that are different from changing the assist mode to the assistance force setting switches 83 and 84. In the example shown in FIG. 21, when the rider clicks the assistance force setting switch 83 while keeping the alternate switch 81 pressed, the display mode of the display panel 72 is changed.

For example, when the indication on the display panel 72 is the normal mode 121, if the rider clicks the assistance force setting switch 83 while keeping the alternate switch 81 pressed, the microcontroller 71 changes the indication on the display panel 72 to the navigation mode 122. If the rider further clicks the assistance force setting switch 83 while keeping the alternate switch 81 pressed, the microcontroller 71 changes the indication on the display panel 72 to the setup mode 123. If the rider further clicks the assistance force setting switch 83 while keeping the alternate switch 81 pressed, the microcontroller 71 changes the indication on the display panel 72 back to the normal mode 121.

If the rider ceases to press the alternate switch 81, the microcontroller 71 sets the currently-existing display mode as the selected display mode, and the display panel 72 maintains this display mode having been set. Moreover, once the alternate switch 81 ceases to be pressed, the microcontroller 71 changes the functions of the assistance force setting switches 83 and 84 back to the function of assist mode changes.

FIG. 22 shows a manipulation in which the rider keeps pressing the assistance force setting switch 84 while keeping the alternate switch 81 pressed. In this example, if the rider keeps pressing the assistance force setting switch 84 while keeping the alternate switch 81 pressed, the microcontroller 71 performs a control to cause the electric assist bicycle 1 to enter the walk-along mode. For example, the microcontroller 71 transmits to the controller 60 a signal indicating that an instruction to enter the walk-along mode has been received from the rider. Having received the signal, the controller 60 enters the walk-along mode, and performs a control to cause the electric motor 53 to generate an assistance force. When the rider ceases to keep pressing at least one of the alternate switch 81 and the assistance force setting switch 84, the walk-along mode is ended.

Thus, even in an implementation in which the manipulation device 80 lacks the walk-along switch 82, an instruction to enter the walk-along mode is able to be received from the rider. Since the assistance force setting switch 84 also provides the function of the walk-along switch 82, while reducing the number of switches on the manipulation device 80, it is possible to receive many kinds of instructions from the rider.

Figure 23:
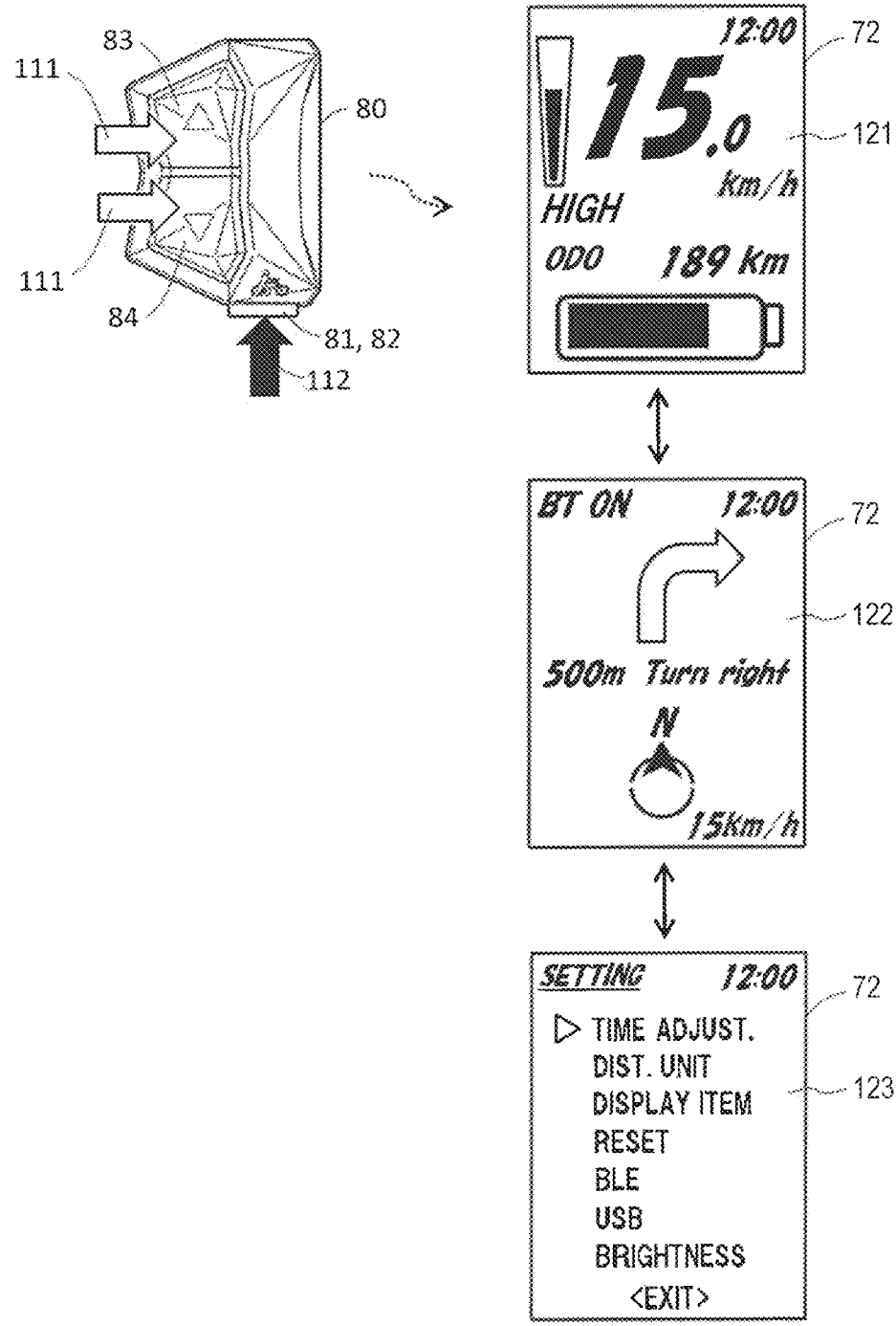
FIG. 23 is a diagram showing another variant of a manipulation device according to a preferred embodiment of the present invention.

Next, another variant of the electric assist bicycle 1 according to the present preferred embodiment will be described. FIG. 23 is a diagram showing another variant of the manipulation device 80 included in the electric assist bicycle 1. In this example, the manipulation device 80 lacks an alternate switch 81 that is disposed forward of the axial center 92 of the left handle bar 32 as discussed above. The walk-along switch 82 also provides the function of the alternate switch 81.

When the rider clicks the assistance force setting switch 83 or 84 in a state of not pressing the walk-along switch 82, an operation of changing the assist mode is performed as described above. In a state in which the rider keeps pressing the walk-along switch 82, the microcontroller 71 assigns functions that are different from changing the assist mode to the assistance force setting switches 83 and 84. In the example shown in FIG. 23, when the rider clicks the assistance force setting switch 83 or 84 while keeping the walk-along switch 82 pressed, the display mode of the display panel 72 is changed. Such a manipulation is realized by clicking the assistance force setting switch 83 or 84 with an index finger while keeping the walk-along switch 82 pressed with a thumb.

For example, when the indication on the display panel 72 is the normal mode 121, if the rider clicks the assistance force setting switch 84 while keeping the walk-along switch 82 pressed, the microcontroller 71 changes the indication on the display panel 72 to the navigation mode 122. If the rider further clicks the assistance force setting switch 84 while keeping the walk-along switch 82 pressed, the microcontroller 71 changes the indication on the display panel 72 to the setup mode 123. Conversely, when the indication on the display panel 72 is the setup mode 123, if the rider clicks the assistance force setting switch 83 while keeping the walk-along switch 82 pressed, the microcontroller 71 changes the indication on the display panel 72 to the navigation mode 122. If the rider further clicks the assistance force setting switch 83 while keeping the walk-along switch 82 pressed, the microcontroller 71 changes the indication on the display panel 72 to the normal mode 121.

If the rider ceases to press the walk-along switch 82, the microcontroller 71 sets the currently-existing display mode as the selected display mode, and the display panel 72 maintains this display mode having been set. Moreover, once the walk-along switch 82 ceases to be pressed, the microcontroller 71 changes the functions of the assistance force setting switches 83 and 84 back to the function of assist mode changes.

The manipulation of changing a portion of the displayed content or setting time in a display mode that has been set are able to be performed by, for example, combining the assistance force setting switches 83 and 84, the walk-along switch 82, the power switch 73 and the lamp activation switch 74 of the display device 70, etc., as appropriate.

Note that, when the rider keeps pressing the walk-along switch 82 while moving the electric assist bicycle 1 at reduced speed and without the feet stepping on the pedals 55, only the walk-along mode may be carried out, while rejecting a manipulation that is a combination of the walk-along switch 82 and the assistance force setting switch 83 or 84 as described above. In this case, a manipulation that is a combination of the walk-along switch 82 and the assistance force setting switch 83 or 84 as described above is to be received only when the electric assist bicycle 1 is not performing the walk-along mode. When the electric assist bicycle 1 is in any state other than moving at reduced speed, e.g., while the electric assist bicycle 1 is stopped, or travelling at a speed greater than about 6 km/h, for example, the walk-along mode may not be carried out, a manipulation that is a combination of the walk-along switch 82 and the assistance force setting switch 83 or 84 as described above may not be received.

In this example, the walk-along switch 82, by which the walk-along mode is to be entered, receives an instruction to change the functions to be assigned to the assistance force setting switches 83 and 84 from the rider. Since the walk-along switch 82 also provides the function of the alternate switch 81, while reducing the number of switches on the manipulation device 80, it is possible to receive many kinds of instructions from the rider.

Figure 24:
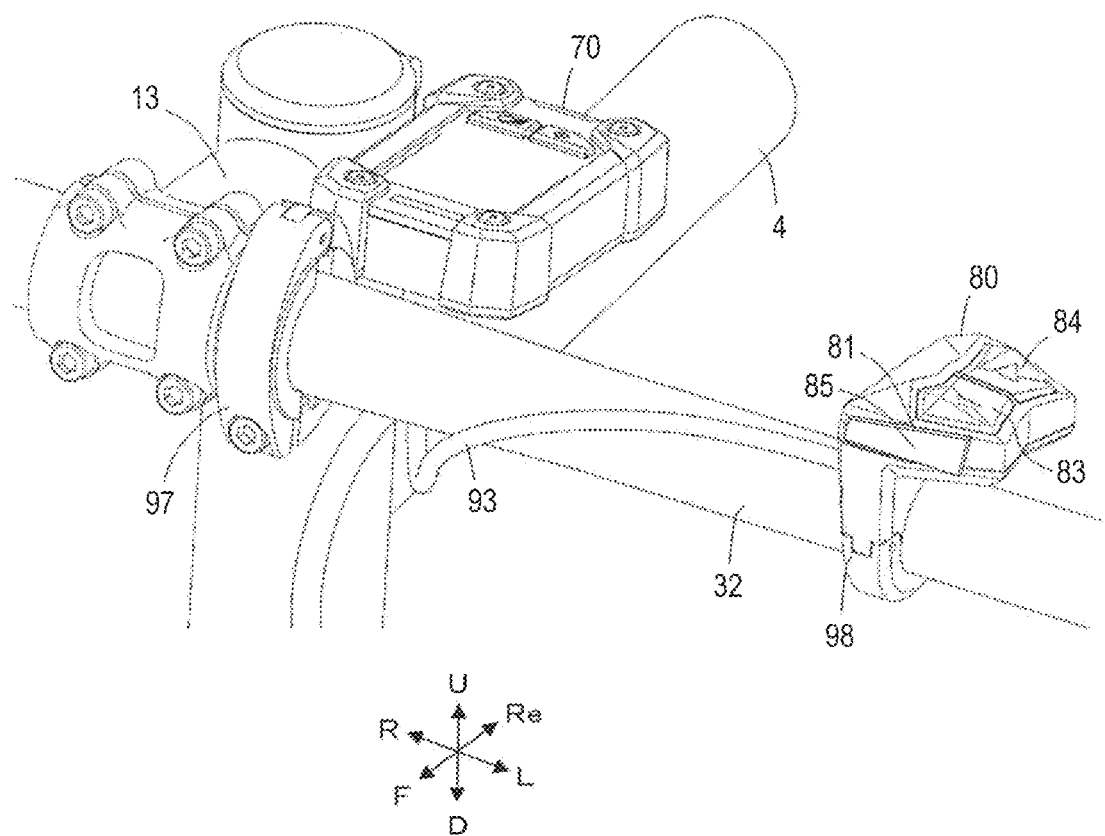
FIG. 24 is a perspective view showing still another variant of a manipulation device according to a preferred embodiment of the present invention.

The alternate switch 81 may be a lever switch, for example. FIG. 24 is a perspective view showing the manipulation device 80 as viewed obliquely from the front left. In the example shown in FIG. 24, the alternate switch 81 is a lever switch. The rider is able to provide a switch manipulation by pushing on a hinge 85 of the alternate switch 81 with a finger. In the present preferred embodiment, a lever switch to be pushed with a finger may also be encompassed by a push button switch.

Figure 25:
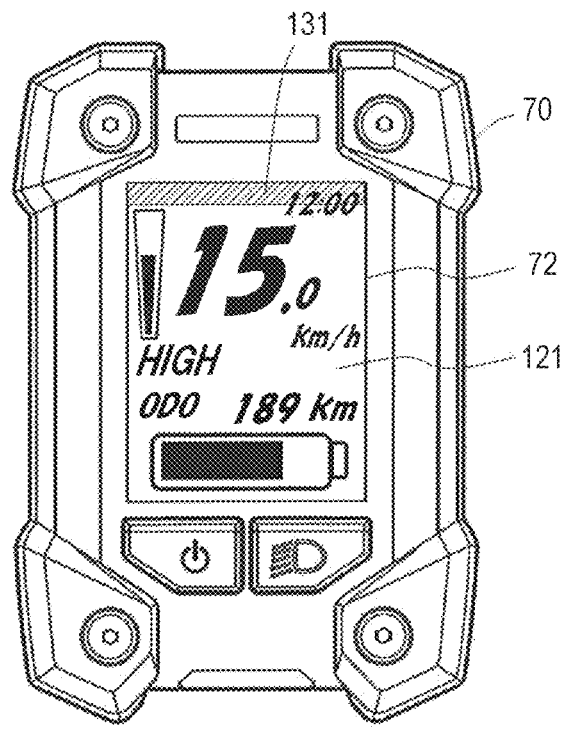
FIG. 25 is a diagram showing a display device which displays a status concerning the received manipulation from the rider regarding an alternate switch according to a preferred embodiment of the present invention.

The display device 70 may display information that represents a status concerning the received manipulation from the rider regarding the alternate switch 81. For example, when the alternate switch 81 is pressed, a portion or a whole of the display panel 72 may be changed in color. As an example, FIG. 25 illustrates a display panel 72 having a display area 131 that changes in color during a period in which the alternate switch 81 is being pressed. By seeing the displayed content on the display device 70, the rider knows how the electric assist bicycle 1 will operate when the operation switches 82, 83 and 84 are manipulated.

Figure 26:
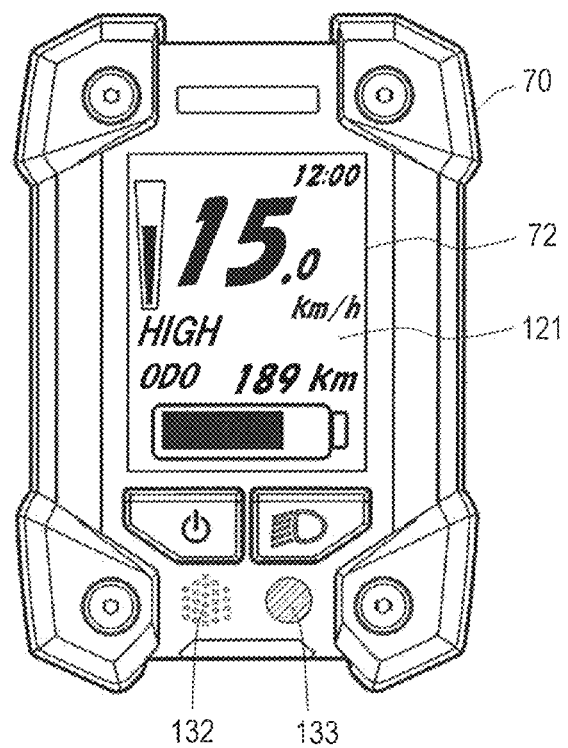
FIG. 26 is a diagram showing alarm devices according to a preferred embodiment of the present invention.

Moreover, the electric assist bicycle 1 may include an alarm device that informs the rider of a status concerning the received manipulation from the rider regarding the alternate switch 81. As an example of the alarm device, FIG. 26 illustrates a display device 70 that includes a loudspeaker 132 and a lamp 133. For example, during a period in which the alternate switch 81 is being pressed, the loudspeaker 132 may generate a sound to inform the rider that a pressing operation of the alternate switch 81 is being received. Also, during a period in which the alternate switch 81 is being pressed, for example, the lamp 133 may be activated or flickered to inform the rider that a pressing operation of the alternate switch 81 is being received. Based on the sound and light, the rider is able to know how the electric assist bicycle 1 will operate when the operation switches 82, 83 and 84 are manipulated. Note that the display device 70 does not need to have both of the loudspeaker 132 and the lamp 133, and may have either one of them.

In the above example, the switches 81, 82, 83 and 84 are preferably push button switches which are manipulated by a rider who presses them with a finger, but they may be other types of switches. For example, at least one of the switches 81, 82, 83 and 84 may be a slide switch, a touch sensor, or the like.

For example, in the case in which the alternate switch 81 is a slide switch, a state in which the alternate switch 81 keeps being manipulated means a state in which the rider keeps a manipulatable portion of the slide switch slid from an initial position. A state in which the rider is not manipulating the alternate switch 81 means a state in which the rider has not slid the manipulatable portion of the slide switch, such that the manipulatable portion stays in its initial position.

For example, in the case in which the alternate switch 81 is a touch sensor, a state in which the alternate switch 81 keeps being manipulated means a state in which a finger of the rider keeps touching the touch sensor. A state in which the rider is not manipulating the alternate switch 81 means a state in which the finger of the rider is not touching the touch sensor.

Moreover, the display device 70 or the manipulation device 80 may include a microphone, and the functions to be assigned to the operation switches 82, 83 and 84 may be altered in accordance with a voice which is uttered by the rider.

Moreover, the alternate switch 81 may be a rotary switch, and the functions to be assigned to the operation switches 82, 83 and 84 may be altered in accordance with the position to which the rider has rotated the rotary switch.

Although the above description illustrates a two-wheeled electric assist bicycle as an example of the electric assist bicycle, the present invention is not limited thereto. For example, the electric assist bicycle may be an electric assist bicycle having three or more wheels.

Although the above describes a rear drive wheel to which the human force generated by the rider stepping on the pedals and the assistance force generated by the electric motor are transmitted, the present invention is not limited thereto. Depending on the implementation of the electric assist bicycle, such human force and assistance force may be transmitted to the front wheel, or transmitted to both of the front wheel and the rear wheel.

Thus, illustrative preferred embodiments of the present invention have been described.

As described above, an electric assist bicycle 1 according to a preferred embodiment of the present invention includes an electric motor 53 that generates an assistance force to assist a human force of a rider; a handle 14 to be gripped by the rider with a hand to steer the electric assist bicycle; and a manipulation device 80 provided on the handle 14. The manipulation device 80 includes an operation switch 82, 83, 84 to receive a manipulation from the rider, and an alternate switch 81 to receive from the rider a manipulation to change the function to be assigned to the operation switch 82, 83, 84. The electric assist bicycle 1 further includes a control circuit 60, 71 which performs a control to cause the electric assist bicycle 1 to execute different operations depending on whether the rider manipulates the operation switch 82, 83, 84 in a state of keeping the alternate switch 81 manipulated or the rider manipulates the operation switch 82, 83, 84 in a state of not manipulating the alternate switch 81.

According to a preferred embodiment of the present invention, depending on whether the rider manipulates the operation switch 82, 83, 84 in a state of keeping the alternate switch 81 manipulated or the rider manipulates the operation switch 82, 83, 84 in a state of not manipulating the alternate switch 81, the electric assist bicycle 1 is caused to execute different operations. This assigns a plurality of functions to the operation switch 82, 83, 84 provided on the handle 14 of the electric assist bicycle 1. It is possible to receive many kinds of instructions from the rider while reducing the number of switches. This allows the manipulation device 80 to be downsized, and provides an improved design freedom.

In a preferred embodiment, the alternate switch 81 may be capable of receiving multiple kinds of manipulations from the rider; and, in accordance with the kind of manipulation received by the alternate switch 81, the control circuit 60, 71 may perform a control to change the operation to be executed by the electric assist bicycle 1 when the rider manipulates the operation switch 82, 83, 84.

This assigns more functions to the operation switch 82, 83, 84 provided on the handle 14 of the electric assist bicycle 1. While reducing the number of switches to be provided on the handle 14 of the electric assist bicycle 1, it is possible to receive many kinds of instructions from the rider.

In a preferred embodiment, the operation switch 82, 83 or 84 may provide the functions of both an operation switch and an alternate switch. For example, the operation switch 82 may also provide the function of an alternate switch. In this case, when the alternate switch (operation switch 82) is manipulated alone, the control circuit 60, 71 may cause the electric assist bicycle 1 to execute a first operation that is different from an operation of changing the function to be assigned to the operation switch 83, 84. The control circuit 60, 71 may cause the electric assist bicycle 1 to execute a second operation that is different from the first operation when the operation switch 83, 84 is manipulated alone. The control circuit 60, 71 may cause the electric assist bicycle 1 to execute a third operation that is different from the first and second operations when the operation switch 83, 84 is manipulated in a state in which the alternate switch (operation switch 82) keeps being manipulated.

By allowing the alternate switch (operation switch 82) to provide a function that is distinct from changing the function to be assigned to the operation switch 83, 84, while reducing the number of switches to be provided on the handle 14 of the electric assist bicycle 1, it is possible to receive more kinds of instructions from the rider. Thus, while reducing the number of switches, it is possible to receive more kinds of instructions from the rider.

In a preferred embodiment, the manipulation device 80 may include a plurality of operation switches 82, 83 and 84, and, in accordance with the rider's manipulation as received by the alternate switch 81, the control circuit 60, 71 may perform a control to change the operation to be executed by the electric assist bicycle 1 when the rider manipulates each of the operation switches 82, 83 and 84.

This assigns a plurality of functions to each of a plurality of operation switches 82, 83 and 84 that are provided on the handle 14 of the electric assist bicycle 1. While reducing the number of switches to be provided on the handle 14 of the electric assist bicycle 1, it is possible to receive more kinds of instructions from the rider.

In a preferred embodiment, the alternate switch 81 is a push button switch, and a state in which the rider is manipulating the alternate switch 81 is a state in which the rider keeps pressing the alternate switch 81. In this case, the control circuit 60, 71 may perform a control to cause the electric assist bicycle 1 to execute different operations depending on whether the operation switch 82, 83, 84 is manipulated in a state in which the rider keeps pressing the alternate switch 81 or the operation switch 82, 83, 84 is manipulated in a state in which the rider is not pressing the alternate switch 81.

Through a manipulation of keeping the alternate switch 81 pressed, which is easy for the rider, a plurality of functions are able to be assigned to the operation switch 82, 83, 84.

In a preferred embodiment, the operation switch 82, 83, 84 is a push button switch. In this case, the control circuit 60, 71 may perform a control to cause the electric assist bicycle 1 to execute different operations depending on whether the rider presses the operation switch 82, 83, 84 in a state of keeping the alternate switch 81 pressed or the rider presses the operation switch 82, 83, 84 in a state of not pressing the alternate switch 81.

Through a manipulation of pressing the operation switch 82, 83, 84 while keeping the alternate switch pressed, which is easy for the rider, a plurality of functions are able to be assigned to the operation switch 82, 83, 84.

In a preferred embodiment, the operation switch 82, 83, 84 and the alternate switch 81 may be switches disposed so as to be manipulated by the rider with fingers, and one of the alternate switch 81 and the operation switch 82, 83, 84 may be disposed forward of the other.

This facilitates simultaneous manipulations of the alternate switch 81 and the operation switch 82, 83, 84, with two fingers of the rider. For example, while manipulating one of the switches with an index finger or a middle finger, the other switch is able to be easily manipulated with a thumb. Since this structure facilitates manipulation of the operation switch 82, 83, 84 in a state of keeping the alternate switch 81 manipulated, the rider is able to quickly perform the manipulation of changing the function to be assigned to the operation switch 82, 83, 84.

In a preferred embodiment, the alternate switch 81 and the operation switch 82, 83, 84 may be disposed in a mutually overlapping positional relationship along the front-rear direction of the electric assist bicycle 1. For example, the alternate switch 81 and the operation switch 82 may be disposed in a mutually overlapping positional relationship along the front-rear direction of the electric assist bicycle 1.

This makes it easy to, while manipulating one of the operation switch 82, 83, 84 and the alternate switch 81 with an index finger or a middle finger, manipulate the other with a thumb. Since this structure facilitates manipulation of the operation switch 82, 83, 84 in a state of keeping the alternate switch 81 manipulated, the ride is able to quickly perform the manipulation of changing the function to be assigned to the operation switch 82, 83, 84.

In a preferred embodiment, the alternate switch 81 may be manipulated by the rider with a finger, and at least a portion of the alternate switch 81 may be disposed forward of the axial center 92 of the handle 14 at a position on the handle 14 where the manipulation device 80 is disposed.

In the body structure of the electric assist bicycle 1, in implementations in which manipulation of the operation switch 82, 83, 84 is performed with a thumb of the rider, manipulating the alternate switch 81 with a finger other than the thumb facilitates simultaneous manipulations of the operation switch 82, 83, 84 and the alternate switch 81. By disposing the alternate switch 81 forward of the axial center 92 of the handle 14, manipulation of the alternate switch 81 with a finger other than the thumb, e.g., an index finger or a middle finger, is facilitated. Since the structure facilitates manipulation of the operation switch 82, 83, 84 in a state of keeping the alternate switch 81 manipulated, the rider is able to quickly perform the manipulation of changing the function to be assigned to the operation switch 82, 83, 84.

In a preferred embodiment, the operation switch 82, 83, 84 is able to be manipulated by the rider with a finger, and at least a portion of the operation switch 82, 83, 84 may be disposed rearward of the axial center 92 of the handle 14.

This allows the operation switch 82, 83, 84 to be disposed in a position where it is easily manipulated with a thumb of the rider. By disposing the alternate switch 81 forward of the axial center 92 of the handle 14, and disposing the operation switch 82, 83, 84 rearward of the axial center 92 of the handle 14, simultaneous manipulations of the operation switch 82, 83, 84 and the alternate switch 81 is facilitated.

In a preferred embodiment, the operation switch 82, 83, 84 is able to be manipulated by the rider with a finger, and at least a portion of the operation switch 82, 83, 84 may be disposed above the alternate switch 81.

This allows the operation switch 82, 83, 84 to be disposed in a position where it is easily manipulated with a thumb of the rider. By disposing the alternate switch 81 forward of the axial center 92 of the handle 14, and disposing the operation switch 82, 83, 84 above the alternate switch 81, simultaneous manipulations of the alternate switch 81 and the operation switch 82, 83, 84 with an index finger and a thumb is facilitated.

In a preferred embodiment, the operation switch 83, 84 defines an assistance force setting switch 83, 84 with which to set the assistance force from the electric motor 53. In this case, while the rider keeps the alternate switch 81 manipulated, the control circuit 60, 71 may assign to the assistance force setting switch 83, 84 a function that is different from setting the assistance force from the electric motor 53.

Since the assistance force setting switch 83, 84 provides a plurality of functions, while reducing the number of switches to be provided on the handle 14 of the electric assist bicycle 1, it is possible to receive more kinds of instructions from the rider.

In a preferred embodiment, the electric assist bicycle 1 may further include a display device 70 to display information concerning the electric assist bicycle 1. In this case, the control circuit 60, 71 may perform a control to change a display mode of the display device 70 when the rider manipulates the assistance force setting switch 83, 84 while keeping the alternate switch 81 manipulated.

Since the assistance force setting switch 83, 84 provides a plurality of functions, while reducing the number of switches to be provided on the handle 14 of the electric assist bicycle 1, it is possible to receive more kinds of instructions from the rider.

In a preferred embodiment, when the rider keeps the assistance force setting switch 83, 84 manipulated while keeping the alternate switch 81 manipulated, the control circuit 60, 71 may perform a control to cause the electric assist bicycle 1 to execute a walk-along mode to allow the electric motor 53 to generate an assistance force while the rider walks along with the electric assist bicycle 1.

As a result, without providing a switch for the walk-along mode in the manipulation device 80, an instruction to enter the walk-along mode is able to be received from the rider. Since the assistance force setting switch 83, 84 provides a plurality of functions, while reducing the number of switches to be provided on the handle 14 of the electric assist bicycle 1, it is possible to receive more kinds of instructions from the rider.

In a preferred embodiment, the operation switch may be a walk-along switch 82 to receive from the rider an instruction to enter the walk-along mode to allow the electric motor 53 to generate an assistance force while the rider walks along with the electric assist bicycle 1.

Since the walk-along switch 82 that receives an instruction to enter the walk-along mode provides a plurality of functions, while reducing the number of switches to be provided on the handle 14 of the electric assist bicycle 1, it is possible to receive more kinds of instructions from the rider.

In a preferred embodiment, the control circuit 60, 71 may perform a control to cause the electric assist bicycle 1 to enter the walk-along mode when the rider keeps the walk-along switch 82 manipulated while keeping the alternate switch 81 manipulated.

The walk-along mode is entered when the walk-along switch 82 is kept manipulated while the alternate switch 81 is kept manipulated. This prevents the walk-along mode from being entered because of unintended touching of the walk-along switch 82 with a finger or luggage, etc.

In a preferred embodiment, when the walk-along switch 82 is manipulated alone, the control circuit 60, 71 may perform a control to cause the electric assist bicycle 1 to execute an operation that is different from the walk-along mode.

Depending on whether the alternate switch 81 is manipulated or not, the function to be assigned to the walk-along switch 82 is changed. As a result, while reducing the number of switches to be provided on the handle 14 of the electric assist bicycle 1, it is possible to receive more kinds of instructions from the rider.

In a preferred embodiment, the alternate switch may be a walk-along switch 82 to receive from the rider an instruction to enter a walk-along mode to allow the electric motor 53 to generate an assistance force while the rider walks along with the electric assist bicycle 1.

The walk-along switch 82 by which the walk-along mode is to be entered receives from the rider an instruction to change the function to be assigned to the operation switch 83, 84. Since the switch 82 that provides a specific function also provides the function of receiving from the rider an instruction to change the function to be assigned to the operation switch 83, 84, while reducing the number of switches to be provided on the handle 14 of the electric assist bicycle 1, it is possible to receive more kinds of instructions from the rider.

In a preferred embodiment, the electric assist bicycle 1 may further include an alarm device 132, 133 to inform the rider of a status concerning the received manipulation from the rider regarding the alternate switch 81.

Informing the rider of a status concerning the received manipulation from the rider allows the rider to know how the electric assist bicycle 1 will operate when the operation switch 82, 83, 84 is manipulated.

In a preferred embodiment, the electric assist bicycle 1 may further include a display device 70 to display information that represents a status concerning the received manipulation from the rider regarding the alternate switch 81.

By seeing the information that is displayed on the display device 70, the rider is able to know how the electric assist bicycle 1 will operate when the operation switch 82, 83, 84 is manipulated.

Thus, preferred embodiments of the present invention have been described. The foregoing description of preferred embodiments is a mere illustration of the present invention, and should not be interpreted as limiting the present invention. Preferred embodiments can also emerge from certain combinations of the component elements described in the above preferred embodiments. Various changes, substitutions, additions, omissions, etc., can be made to the present invention without departing from the scope defined by the claims and the equivalents thereof.

Preferred embodiments of the present invention are particularly useful for electric assist bicycles that include a manipulation device.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electric assist bicycle comprising:
    an electric motor that generates an assistance force to assist a human force of a rider;
    a handle to be gripped by the rider with a hand to steer the electric assist bicycle;
    a manipulation device provided on the handle, the manipulation device including an operation switch that receives a manipulation from the rider and an alternate switch that receives a manipulation from the rider to change a function to be assigned to the operation switch;
    a control circuit that performs a control to alter an operation to be executed by the electric assist bicycle depending on whether the rider manipulates the operation switch in a state of keeping the alternate switch manipulated, or the rider manipulates the operation switch in a state of not manipulating the alternate switch; and
    a display that displays information concerning the electric assist bicycle; wherein
    the control circuit performs a control to change a display mode of the display when the rider manipulates the operation switch while keeping the alternate switch manipulated, and to display additional information within the display mode when the rider manipulates the operation switch or the alternate switch.

2. The electric assist bicycle of claim 1, wherein
    the alternate switch is able to receive a plurality of kinds of manipulations from the rider; and
    in accordance with the kind of manipulation received by the alternate switch, the control circuit performs a control to change the operation to be executed by the electric assist bicycle when the rider manipulates the operation switch.

3. The electric assist bicycle of claim 1, wherein
the alternate switch is disposed so as to be manipulated by a finger of the rider; and
the control circuit performs a control to:
  when the alternate switch is manipulated alone, cause the electric assist bicycle to execute a first operation that is different from an operation of changing the function to be assigned to the operation switch;
  when the operation switch is manipulated alone, cause the electric assist bicycle to execute a second operation that is different from the first operation; and
  when the operation switch is manipulated in a state in which the alternate switch keeps being manipulated, cause the electric assist bicycle to execute a third operation that is different from the first and second operations.

4. The electric assist bicycle of claim 1, wherein
the manipulation device includes a plurality of the operation switches; and
the control circuit performs a control to, in accordance with the rider's manipulation received by the alternate switch, change the operation to be executed by the electric assist bicycle when the rider manipulates each of the operation switches.

5. The electric assist bicycle of claim 1, wherein
the alternate switch is a push button switch;
the state in which the rider keeps the alternate switch manipulated is a state in which the rider keeps the alternate switch pressed; and
the control circuit performs a control to alter an operation to be executed by the electric assist bicycle depending on whether the rider manipulates the operation switch in a state of keeping the alternate switch pressed, or the rider manipulates the operation switch in a state of not pressing the alternate switch.

6. The electric assist bicycle of claim 5, wherein
the operation switch is a push button switch; and
the control circuit performs a control to alter an operation to be executed by the electric assist bicycle depending on whether the rider presses the operation switch in a state of keeping the alternate switch pressed, or the rider presses the operation switch in a state of not pressing the alternate switch.

7. The electric assist bicycle of claim 1, wherein
the operation switch and the alternate switch are disposed so as to be manipulated by fingers of the rider; and
one of the operation switch and the alternate switch is located forward of the other of the operation switch and the alternate switch.

8. The electric assist bicycle of claim 1, wherein the operation switch and the alternate switch are disposed in a mutually overlapping positional relationship along a front-rear direction of the electric assist bicycle.

9. The electric assist bicycle of claim 1, wherein
the alternate switch is disposed so as to be manipulated by a finger of the rider; and
at least a portion of the alternate switch is located forward of an axial center of the handle at a position on the handle where the manipulation device is located.

10. The electric assist bicycle of claim 9, wherein
the operation switch is disposed so as to be manipulated by a finger of the rider; and
at least a portion of the operation switch is located rearward of the axial center of the handle.

11. The electric assist bicycle of claim 9, wherein
the operation switch is disposed so as to be manipulated by a finger of the rider; and
at least a portion of the operation switch is located above the alternate switch.

12. The electric assist bicycle of claim 1, wherein
the operation switch defines an assistance force setting switch that sets the assistance force from the electric motor; and
while the rider keeps the alternate switch manipulated, the control circuit assigns to the assistance force setting switch a function that is different from setting the assistance force from the electric motor.

13. The electric assist bicycle of claim 12, wherein, when the rider keeps the assistance force setting switch manipulated while keeping the alternate switch manipulated, the control circuit performs a control to cause the electric assist bicycle to enter a walk-along mode to allow the electric motor to generate an assistance force while the rider walks along with the electric assist bicycle.

14. The electric assist bicycle of claim 1, wherein the operation switch defines a walk-along switch to receive from the rider an instruction to enter a walk-along mode to allow the electric motor to generate an assistance force while the rider walks along with the electric assist bicycle.

15. An electric assist bicycle comprising:
an electric motor that generates an assistance force to assist a human force of a rider;
a handle to be gripped by the rider with a hand to steer the electric assist bicycle;
a manipulation device provided on the handle, the manipulation device including an operation switch that receives a manipulation from the rider and an alternate switch that receives a manipulation from the rider to change a function to be assigned to the operation switch; and
a control circuit that performs a control to alter an operation to be executed by the electric assist bicycle depending on whether the rider manipulates the operation switch in a state of keeping the alternate switch manipulated, or the rider manipulates the operation switch in a state of not manipulating the alternate switch; wherein
the operation switch defines a walk-along switch to receive from the rider an instruction to enter a walk-along mode to allow the electric motor to generate an assistance force while the rider walks along with the electric assist bicycle; and
the control circuit performs a control to cause the electric assist bicycle to enter and maintain the walk-along mode when the rider keeps the walk-along switch manipulated while keeping the alternate switch manipulated.

16. The electric assist bicycle of claim 15, wherein, when the walk-along switch is manipulated alone, the control circuit performs a control to cause the electric assist bicycle to execute an operation that is different from the walk-along mode.

17. The electric assist bicycle of claim 1, wherein the alternate switch defines a walk-along switch to receive from the rider an instruction to enter a walk-along mode to allow the electric motor to generate an assistance force while the rider walks along with the electric assist bicycle.

18. The electric assist bicycle of claim 1, further comprising an alarm that informs the rider of a status concerning the manipulation received from the rider regarding the alternate switch.

19. The electric assist bicycle of claim 1, wherein the display displays information that represents a status concerning the manipulation received from the rider regarding the alternate switch.

\* \* \* \* \*